US008219827B2

(12) United States Patent
Nicolson et al.

(10) Patent No.: US 8,219,827 B2
(45) Date of Patent: Jul. 10, 2012

(54) SECURE BOOT WITH OPTIONAL COMPONENTS

(75) Inventors: Kenneth Alexander Nicolson, Hyogo (JP); Hideki Matsushima, Osaka (JP); Hisashi Takayama, Osaka (JP); Takayuki Ito, Osaka (JP); Tomoyuki Haga, Nara (JP); Manabu Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 561 days.

(21) Appl. No.: 12/484,537

(22) Filed: Jun. 15, 2009

(65) Prior Publication Data

US 2009/0320110 A1 Dec. 24, 2009

(30) Foreign Application Priority Data

Jun. 23, 2008 (JP) ................................. 2008-163471

(51) Int. Cl.
*H04L 29/06* (2006.01)

(52) U.S. Cl. ............ 713/187; 713/1; 713/100; 713/155; 713/156

(58) Field of Classification Search .............. 713/1, 100, 713/155, 156, 187
See application file for complete search history.

(56) References Cited

U.S. PATENT DOCUMENTS

| 6,223,291 B1 * | 4/2001 | Puhl et al. ....................... 726/28 |
| 6,314,520 B1 | 11/2001 | Schell et al. |
| 6,477,648 B1 | 11/2002 | Schell et al. |
| 2004/0193872 A1 * | 9/2004 | Saarepera et al. ............. 713/156 |
| 2005/0021968 A1 * | 1/2005 | Zimmer et al. ................ 713/176 |
| 2005/0138414 A1 | 6/2005 | Zimmer et al. |
| 2009/0307487 A1 * | 12/2009 | Movva et al. ................. 713/156 |
| 2009/0316908 A1 * | 12/2009 | Ekberg et al. ................. 380/278 |
| 2010/0185845 A1 * | 7/2010 | Takayama et al. ................ 713/2 |

OTHER PUBLICATIONS

Ekberg et al, Mobile Trusted Module—an introduction, Nov. 2007, Retrieved from http://research.nokia.com/files/tr/NRC-TR-2007-015.pdf, pp. 1-13.*
Schellekens et al, Embedded Trusted Computing with Authenticated Non-volatile Memory, Apr. 24, 2008, Retrieved from http://www.cosic.esat.kuleuven.be/publications/article-1013.pdf, pp. 1-15.*
"TCG Mobile Reference Architecture", Specification version 1.0, Revision 1, Jun. 12, 2007.
"TCG Mobile Trusted Module Specification", Specification version 1.0, Revision 1, Jun. 12, 2007.
"TPM Main Part 2 TPM Structures", *Specification Version 1.2, Level 2 Revision 116*, Mar. 1, 2011, TCG Published.

* cited by examiner

*Primary Examiner* — Haresh N Patel
*Assistant Examiner* — Chau Le
(74) *Attorney, Agent, or Firm* — Wenderoth, Lind & Ponack, L.L.P.

(57) ABSTRACT

A method manages optional trusted components that are active within a device, such that the device itself controls the availability of trusted components. The device includes: a storing unit storing a plurality of pieces of software and a plurality of certificates; a receiving unit receiving the certificates; and a selecting unit selecting one of the certificates. The device further includes an executing unit verifying an enabled one of the plurality of pieces of software using the selected and updated one of the certificates.

14 Claims, 19 Drawing Sheets

FIG. 4

| Logical certificate label | Dependent trusted component status | Dependent trusted component mask | RIM Certificate label |
|---|---|---|---|
| Trusted Component 2 Verify | Trusted Component 1 OK | Trusted Component 1 | cmp1_v01 |
| Trusted Component 2 Verify | Trusted Component 1 FAILED | Trusted Component 1 | cmp1_v02 |
| Trusted Component 3 Verify | Trusted Component 1 OK, Trusted Component 2 OK | Trusted Component 1, Trusted Component 2 | cmp2_v01 |
| Trusted Component 3 Verify | Trusted Component 1 FAILED, Trusted Component 2 OK | Trusted Component 1, Trusted Component 2 | cmp2_v02 |
| Trusted Component 3 Verify | Trusted Component 1 OK, Trusted Component 2 OK | Trusted Component 1, Trusted Component 2 | cmp2_v03 |

FIG. 5

| Optional Component Control | 208 |
| --- | --- |
| RIMProtectValue | 502 |
| Logical Certificate Label 1 | 504 |
| Enabled flag 1 | 506 |
| Logical Certificate Label 2 | |
| Enabled flag 2 | |
| Logical Certificate Label 3 | |
| Enabled flag 3 | |
| ⋮ | |
| -1 (End of table signal value) | 508 |
| FALSE (dummy value) | 510 |
| Cryptographic signature | 512 |

514 — Logical Certificate Label table

SECURE BOOT WITH OPTIONAL COMPONENTS

BACKGROUND OF THE INVENTION (1) Field of the Invention

The present invention relates to a device connectable to a server, and including: a storing unit which stores a plurality of pieces of software and a plurality of certificates that are associated with the plurality of pieces of the software and are used to verify the plurality of pieces of the software; and an executing unit which verifies the plurality of pieces of the software using the certificates and executes the plurality of pieces of the software after the verification.

(2) Description of the Related Art

Initiatives such as the Trusted Computing Group's (TCG) Mobile Trusted Module (MTM) documents TCG Mobile Reference Architecture version 1.0 12 Jun. 2007 and TCG Mobile Trusted Module Specification version 1.0 12 Jun. 2007 describe how to start-up a device in an assured and trusted fashion. These methods have been thoroughly reviewed to ensure that trust and security is maintained throughout the boot process, so provide a useful baseline for those wanting to implement a device that can boot securely. A key component of this secure boot process is a RIM Certificate. This is a signed structure that defines what the current expected platform state should be, represented by a hash of a set of Platform Configuration Registers (PCRs), which themselves contain known, publically defined hash values. These PCRs act as integrity measurement information that may be recorded in RIM Certificates to define an expected machine state. In addition, the RIM Certificate also specifies a PCR to be extended if the current state is verified. This extend process takes a specified PCR and calculates a new hash value based on the previous PCR value concatenated with a new known value defined within the RIM Certificate. A typical secure boot sequence as defined by the TCG starts with the initialisation and self-verification of the core components such as the roots of trust for verification and for measurement (the RTV+RTM), the MTM itself and associated core MTM interface components. Next, additional components that support other parts of the firmware are started in a trusted fashion, for example, each of them is verified on their starting by another component having been booted before them. And finally the operating system runs to provide a secure and trusted path for client applications to access MTM services.

The TCG specifications provide facilities for auditing, recognising that portable devices such as mobile phones have limited resources. Although they define these auditing features are optional with an MTM, but this makes problems shown below.

In TCG specifications, the RIM certificates can be updated. However, the specification does not show how to update the RIM certificates in a system which has one or more optional components.

Here, optional components mean, for example, application software which can be activated after extra contract by a user. Here, "activated (or enabled)" means changing a state of the application software to a state the user can run the application software. Unless the software is activated, the user cannot use the application software, even if the application software itself is pre-installed in the machine or downloaded from a server.

As described above, whether an optional component is activated or not is depending on, for example, each user's decision. So, the server for sending updated RIM certificates to the machine needed to know which components are activated for each machine in order to send updated certificates corresponding to the activated components.

However, it is very cumbersome and takes much cost to make a customized set for each machine.

In US Patent application publication 2005/0138414 by Zimmer et al a verified boot method with optional components is disclosed, but it does not teach how to solve this problem.

In U.S. Pat. No. 6,477,648 by Schell et al a verified boot method with components that may fail verification is disclosed, but it does not teach how to solve this problem.

What is needed, therefore, is a machine and a server for updating certificates without making a customized set of updated certificates for each machine even if the machine has optional components.

SUMMARY OF THE INVENTION

In order to solve this problem, according to the present invention, a device connectable to a server, includes: a storing unit which stores a plurality of pieces of software and a plurality of certificates associated with the plurality of pieces of the software, each of the plurality of pieces of the software being assigned to one certificate, each of the plurality of certificates being used to verify each of the plurality of pieces of the software; a setting unit which sets to the device one of the plurality of pieces of software as enabled one of the plurality of pieces of software, the enabled one of the plurality of pieces of software being capable of being executed at the device; an executing unit which verifies the enabled one of the plurality of pieces of software using the certificate associated with the enabled one of the plurality of pieces of software, and to execute the enabled and verified one of the plurality of pieces of software after the verification; a receiving unit which receives from the server, a plurality of updated certificates corresponding to predetermined certificates determined to be updated among the plurality of the certificates by the server, the server determines the certificates to be updated without detecting which one of the plurality of updated certificates is corresponding to the enabled one of the plurality of pieces of software; and a selecting unit which selects, from the received plurality of the updated certificates, one updated certificate corresponding to the certificate associated with the enabled one of the plurality of pieces of software, in which the executing unit which verifies the enabled one of the plurality of pieces of software using the one updated and selected certificate.

By this structure, the device receives updated certificates are generated by the server without detecting which updated certificates are corresponding to enabled component. And, the device selects an updated certificate to be updated from received updated certificates. So, this aspect of invention can update appropriate certificates without customising a set of certificates to be sent by the server.

Further Information about Technical Background to this Application

The disclosure of Japanese Patent Application No. 2008-163471 filed on Jun. 23, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 illustrates the Map label to cert table that is attached to a RIM Certificate;

FIG. 5 illustrates an Optional Component Control structure containing a counter value, a table of certificate identifiers and their statuses, and a cryptographic signature representing the states of the optional components;

DETAILED DESCRIPTION OF THE INVENTION

Figure 1:
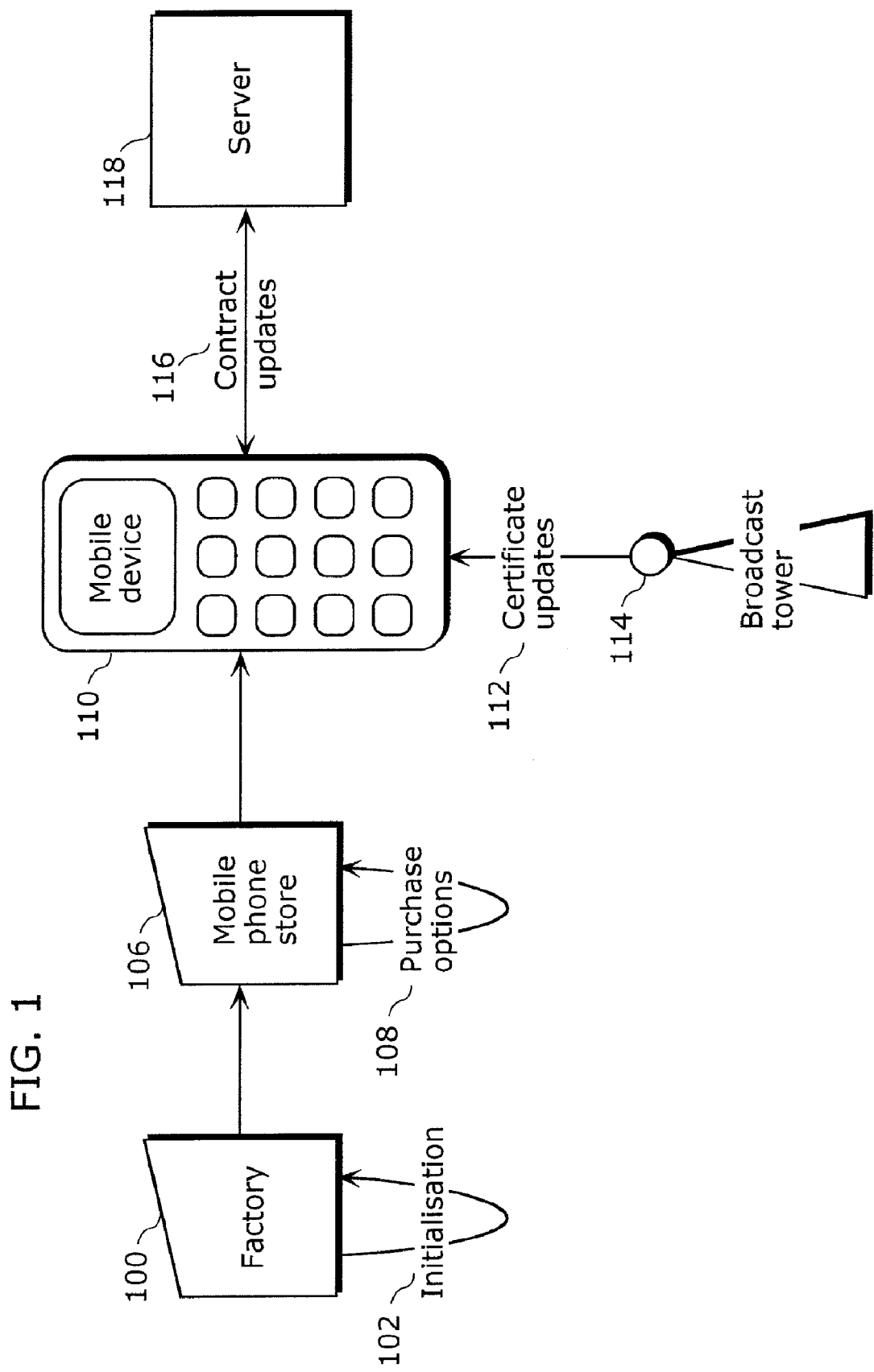
FIG. 1 illustrates the lifetime of a mobile device and the external interactions that involve the Optional Component Control structure.

According to a 1st aspect of the present invention, a device connectable to a server (for example, a mobile device 110, or a part of the mobile device 110) including, a storing unit which stores a plurality of pieces of software and a plurality of certificates associated with the plurality of pieces of the software, each of the plurality of pieces of the software being assigned to one certificate, each of the plurality of certificates being used to verify each of the plurality of pieces of the software; a setting unit which sets to the device one of the plurality of pieces of software as enabled one of the plurality of pieces of software, the enabled one of the plurality of pieces of software being capable of being executed at the device; an executing unit which verifies the enabled one of the plurality of pieces of software using the certificate associated with the enabled one of the plurality of pieces of software, and to execute the enabled and verified one of the plurality of pieces of software after the verification; a receiving unit (for example, an update receiver 214 or a part of the update receiver 214) which receives from the server, a plurality of updated certificates corresponding to predetermined certificates determined to be updated among the plurality of the certificates by the server, the server determines the certificates to be updated without detecting which one of the plurality of updated certificates is corresponding to the enabled one of the plurality of pieces of software; and a selecting unit (for example, a certificate updater 212, or a part of the certificate updater) which selects, from the received plurality of the updated certificates, one updated certificate corresponding to the certificate associated with the enabled one of the plurality of pieces of software, in which the executing unit verifies the enabled one of the plurality of pieces of software using the one updated and selected certificate.

According to a 2nd aspect of the present invention, the server transmits commonly the plurality of the updated certificates to the device and another device.

According to a 3rd aspect of the present invention, the plurality of the updated certificates includes an updated certificate corresponding to a certificate associated with another one of the plurality of pieces of software than the enabled one of the plurality of pieces of software.

According to a 4th aspect of the present invention, the device further including: an updating unit (for example, the certificate updater 212 or a part of the certificate updater) which updates the certificate associated with the enabled one of the plurality of pieces of software, based on the one updated certificate, in which the executing unit verifies the enabled one of the plurality of pieces of software using the certificate updated by the updating unit.

According to a 5th aspect of the present invention, the updating unit which deletes an unselected updated certificate from the received plurality of the updated certificates, without updating the certificate corresponding to the unselected updated certificate.

According to a 6th aspect of the present invention, the device further comprising: an device key storing unit which stores a device key, the device key is a unique key of the device; the updating unit updates the certificate associated with the enabled one of the plurality of pieces of software, by converting the one updated certificate using the device key, and overwriting the certificate associated with the enabled one of the plurality of pieces of software with the converted one updated certificate.

According to a 7th aspect of the present invention, the device further comprising: a revocation determining unit which determines one certificate as revoked, when an updated certificate corresponding to the one certificate is not included in the received plurality of updated certificates; and a revoking unit which revokes the one certificate stored in the storing unit.

By this structure, the device determines which certificate is to be revoked by checking whether or not an updated version of the certificate is included in the received updated certificates.

According to this aspect of the present invention, the device can revoke a component (and a certificate corresponding to the component) at the same time of updating the certificates. So, this aspect of invention can revoke a certificate without sending extra information such as a revocation list.

According to a 8th aspect of the present invention, the device further comprising: an flag storing unit which stores an enabling flag indicating the enabled one of the plurality of pieces of software, when the setting unit sets to the device the one of the plurality of pieces of software as the enabled one of the plurality of pieces of software, in which the selecting unit which selects, from the received plurality of the updated certificates, one updated certificate corresponding to the certificate associated with the enabled one of the plurality of pieces of software, based on the enabling flag stored in the flag storing unit.

According to a 9th aspect of the present invention, the device further comprising: a counter which increments a counter value when the revoking unit revokes the one certificate stored in the storing unit; a counter value setting unit which sets the incremented counter value to management information including the enabling flag when the counter value is incremented; and a determining unit which determines whether the management information is tampered with, using the counter value set in the management information.

According to a 10th aspect of the present invention, the device further comprising: a calculation unit which calculates a cryptographic hash value of the management information including the enabling flag and the counter value; a value storing unit which stores a verification value corresponding to the calculated cryptographic hash value; a verifying unit which verifies whether or not the management information is tampered with by comparing the stored verification value and the calculated cryptographic hash value, before the selecting unit uses the management information for selecting the one updated certificate.

According to a 11th aspect of the present invention, the device further comprising: a mapping data storing unit which stores a mapping data (for example, mapLabeltoCertTable 308 in FIG. 3) showing mapping between the plurality of pieces of software and the plurality of certificates; a calculation unit which calculates a cryptographic hash value of the mapping data; a value storing unit which stores a verification value corresponding to the calculated cryptographic hash value; a verifying unit which verifies whether or not the mapping data is tampered with by comparing the stored verification value and the calculated cryptographic hash value, before the selecting unit selects the one updated certificate; and said selecting unit select the one updated certificate based on the mapping data.

According to a 12th aspect of the present invention, the device further comprising: a counter which increments a counter value when the revoking unit revokes the one certificate stored in the storing unit; a counter value assigning unit which assigns the incremented counter value to the mapping data when the counter value is incremented; and the calculation unit calculates the cryptographic hash value using the mapping data and the counter value assigned to the mapping data.

OVERVIEW OF THE PRESENT EMBODIMENT

The present embodiment relates to a system for updating a certificate used for verifying a piece of software. In a device, if there is one or more optional components, it is depending on a user's decision which component is being activated. So, usually a server needs to know which components are activated for each device in order to send updated certificates corresponding to active components. And, the server sends a customized set of updated certificates, corresponding to active components of each device, for the each device.

However, it is very cumbersome and takes much cost to make a customized set for each device. So, in the present embodiment, a system for updating certificates without making a customized set for each device is shown.

Furthermore, in the prior art, the optional components are not be disabled. So, even if some of the optional components are found to be vulnerable after e installation, it was impossible to make the vulnerable component disabled. Usually, in order to revoke some components, a revocation list showing the revoked components is sent to each device. However, in a mobile phone system, for example, it is difficult to force the users download the revocation list, because a communication fee is charged even on downloading the revocation list. Though, this fee may be charged on a manufacturer instead of users, it is remaining fact that this charge makes it hard to download or send revocation list.

So, in this invention, a system which can revoke some components easily and reasonably is shown.

In the present embodiment, the server makes a set of updated certificates including all candidate pieces of software which can be activated in the device. The device receives the set from the server, and search updated certificates corresponding to pieces of software which are being activated in the device. By this structure, the server need not customize a set of updated certificates for each device.

By this structure, the present embodiment can update appropriate certificates without customising a set of certificates to be sent by the server.

Furthermore, to revoke some piece of software, the server excludes a certificate corresponding to revoked piece of software from the set. And, if the device find one or certificates are not included in the received set, the device judges the certificates are revoked. The device makes the component disabled by deleting the revoked certificates. When the certificate is deleted, verification of the component corresponding to the certificate always fails. As a result the component will be also revoked.

By this structure, the present embodiment can revoke a component (and a certificate corresponding to the component) without sending extra information such as a revocation list.

The present invention relates to a system for supporting optional or failing components within a system that will perform a secure boot. By providing the described additional RIM Certificates and data tables, a developer of a device that supports secure boot is able to produce a system that has flexibility to deal with components that fail to start, and a device that is able to report the state of the components within the trusted environment that results from the secure boot. By further providing a list of active optional components, the system will also deal with components that may be enabled and disabled by external actors. The present embodiment is supposing a system in which at least one component in the device is optional, and the certificate is used to verify the component and other component(s) booted before the component at the timing of booting the component. So, in an usual system, a fail in boot process of an component effects on boot processes of other components which boot after the failed component, even if the failed component is optional and other components themselves are valid. To avoid this problem, the present embodiment uses fail RIM Cert and success RIM Cert described below.

This structure is also new from the prior art. However, please note that the part of present invention relating to updating and revoking certificates can be applied to a system which does not deal with the problem shown above.

A new system and method for updating and revoking components including dealing with optional components on a device that supports secure boot is described. In the following description, for purposes of explanation numerous specific details are set forth in order to provide a thorough understanding of the present invention. In other instances, well-known structures and devices are shown in block diagram form without explaining their specific details to facilitate explanation. It will be evident, however, to one of ordinary skill in the art that the present invention may be practiced by modifying or without these specific details. The description of preferred embodiments is not intended to limit the scope of the claims appended hereto.

DETAIL OF THE PRESENT EMBODIMENT

FIG. 1 illustrates the lifecycle of a mobile device (110). At the factory (100) an initialisation (e.g., initialization) process (102) installs a set of optional components along with information about which optional components are available for each device. When it gets shipped to a mobile phone store (106) or other vendor such as an online store, etc, the customer may purchase various options (108) corresponding to optional components. The mobile device (110) is now ready to be used, and during the lifetime of the device activities such as certificate updates (112) for optional and mandatory components being broadcast (114) to all devices will occur. In addition, the device owner may explicitly update their contract options (116) through a server (118) provided by the mobile phone carrier or other device management entity, causing the set of optional components available to a particular device to be updated. The behaviour of each of these processes involved in managing the optional components will be described below.

Figure 2:
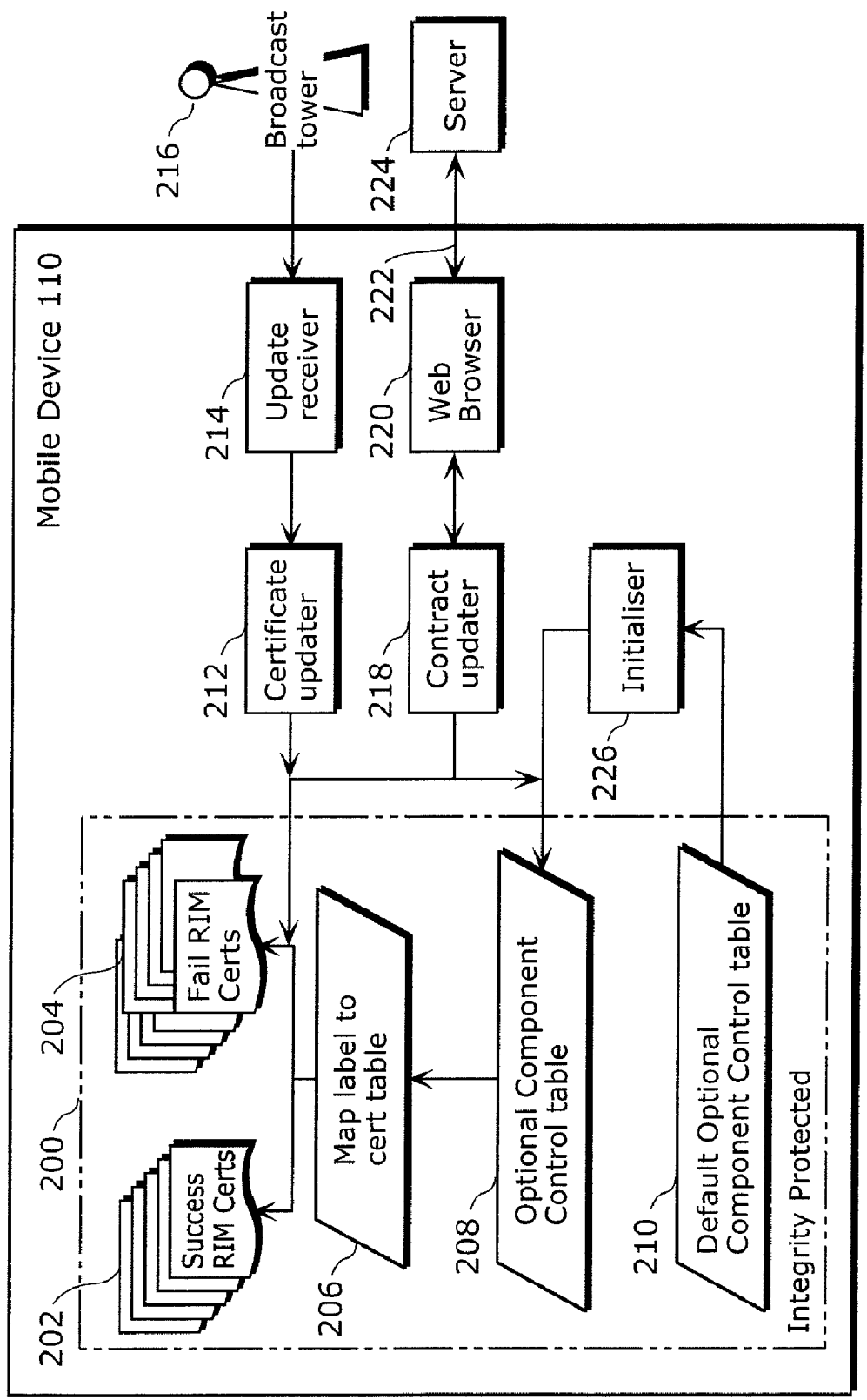
FIG. 2 illustrates a block diagram representing the key components for maintaining the Optional Component Control table and related data.

FIG. 2 illustrates an aspect of the current invention, namely the method for creating and maintaining the optional components within the system, and components of the mobile device (110). The key functional elements and data items are as follows. First, the data structures are all integrity protected (200), such that in the preferred embodiment this is achieved by the use of signed hashes. The data structures are first the Success RIM Certs (202) and Fail RIM Certs (204), the certificates that describe the expected platform states during a secure boot where all components are operating correctly and one or more components have failed to operate correctly respectively. The Map label to cert table (206) maps the statuses of the trusted components to specific Success RIM Certs (202) or Fail RIM Certs (204), the Optional Component Control table (208) describes which optional trusted components are active or inactive, and the default Optional Component Control table (210) that serves to initialise the Optional Component Control table (208) at first boot of the mobile phone, or at other times should the active Optional Component Control table (208) become corrupted. In a preferred embodiment, the structure of this table is identical to that of the Optional Component Control table (208). To initialize this Optional Component Control table (208) the Initialiser (initializer) (226) creates an Optional Component Control table (208) based upon the default Optional Component Control table (210). The details of this process are described later.

The Certificate updater (212) keeps the Success RIM Certs (202) and Fail RIM Certs (204) up to date, by processing a list of certificates delivered from a mobile phone broadcast tower (216) over the wireless network, and received at the device by the Update receiver (214). The details of this process are described later. One ordinarily skilled in the art will see that there are other ways to make these updates available, such as through a memory card, or via other wired or wireless transmission means.

The Contract updater (218) maintains the active and inactive statuses of the Optional Component Control table (208) by requesting the Web browser (220) on the device (110) to access an optional component maintenance page located on the Server (224). In a preferred embodiment, the Web browser (220) to Server connection (224) uses the Secure Socket Layer (SSL) (222) to protect the communication channel from attack. The details of this process are described later.

Figure 3:
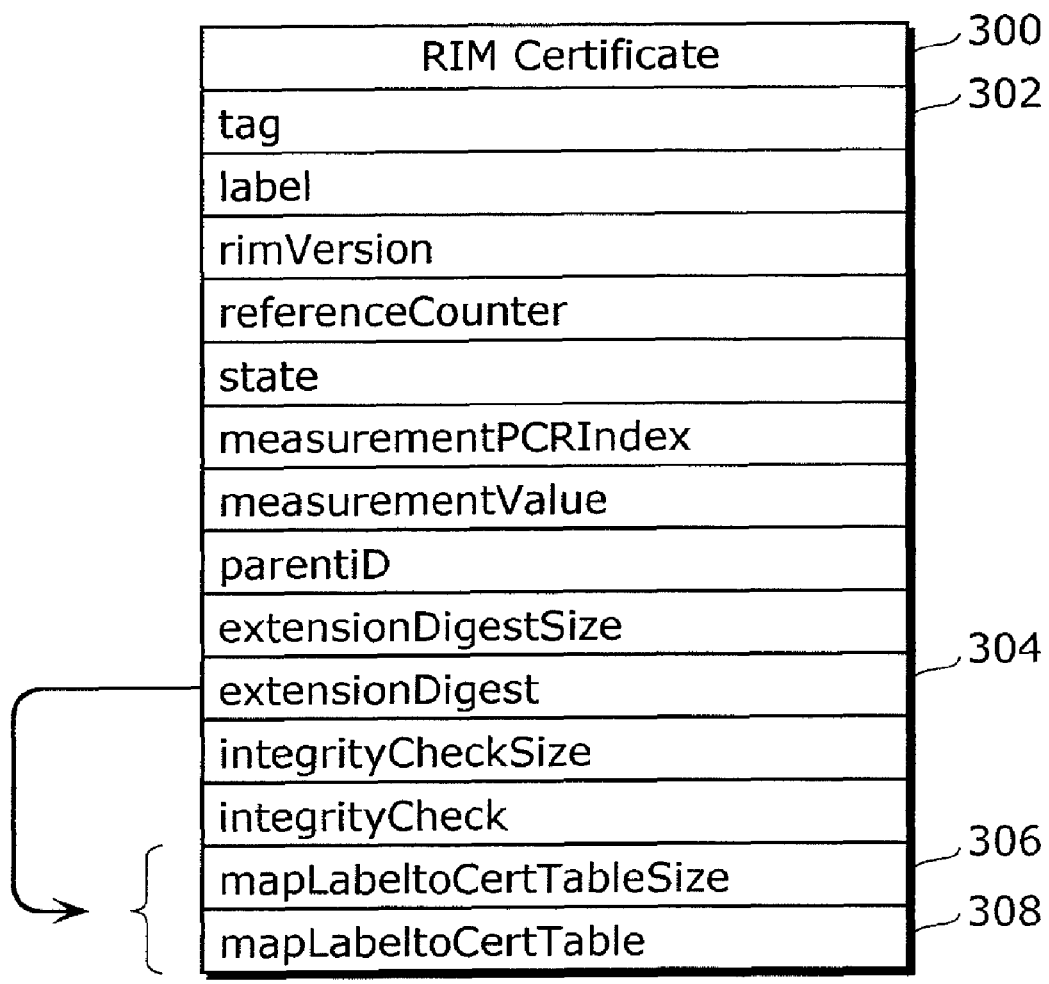
FIG. 3 illustrates a RIM Certificate containing additional data representing the table needed to support optional components.

FIG. 3 illustrates a RIM Certificate (300), a detail of Success RIM Cert (202) and Fail RIM Cert (204), an expansion of the RIM Certificate as defined by the prior art. To enable support for optional components, the mapLabeltoCertTableSize (306), and mapLabeltoCertTable (308) are appended to the certificate, and the extensionDigest (304) entry contains a cryptographic hash value for this extra data. Only one instance of this extended RIM certificate is required, and one embodiment attaches this table to the single RIM Certificate that the RTV+RTM uses to self-verify. This aspect of the prior art is not described here, however.

One ordinarily skilled in the art will see that there are other ways to make available and to maintain the integrity of mapLabeltoCertTable (308) without using a RIM Certificate (300), such as cryptographically signing the table using a secret key known to both the signee and to the device.

FIG. 4 illustrates the format of the Map label to Cert table (308) with data entries that illustrate a mapping from logical identifiers and previous software components to actual RIM Certificates. The first column, Logical certificate label (400) is an identifier that signifies a particular role for a RIM Certificate and is the identifier that other parts of the system use to request a RIM Certificate. The second column, Dependent trusted component status (402) is a set of flags indicating for what set of Trusted component error states each row is valid. The third column, Dependent trusted component mask (404) is a set of flags indicating which components are to have their statuses checked. In one embodiment, these two columns are implemented using bitmaps. Finally, the RIM Certificate label (406) column holds the actual RIM Certificate label that is to be used to look up the Success RIM Cert (202) or Fail RIM Cert (204) from the RIM Certificate database. This value represents a RIM Certificate label field as defined by the TCG.

In order to manage these Trusted Components that may be optionally activated by an external actor such as the mobile device owner or the mobile device service provider or the mobile device manufacturer, the device will maintain a list of which optional trusted component are active or inactive. FIG. 5 illustrates a preferred embodiment of this data, in the Optional Component Control structure (208). The RIMProtectValue (502) is a copy of the counterRIMProtect monotonic counter as defined by the TCG Mobile Trusted Module Specification at the time of creation of the structure, to help protect the structure against rollback or reflash attacks. Next is a table with two fields in each row; first an optional trusted component Logical certificate label (504), which uses the same component identifiers as used for the Logical certificate label (400) in the mapLabeltoCertTable (308). Next, a flag (506) to indicate whether or not the optional trusted component identified by the Logical certificate label (504) is enabled, in which case the flag is set to TRUE, or disabled, in which case the flag is set to FALSE. This pair of values is repeated for each optional trusted component in the system, and the table is terminated by a Logical certificate label of −1 (508) and a flag conventionally set to FALSE (510), for inactive. Collectively, this set of pairs of values is known as the Logical certificate label table (514). Finally, to protect all the above data within the Optional Component Control structure from tampering, there is a cryptographic signature (512) produced according to the PKCS v1.5 algorithm signed with a secret key created as described in FIG. 6 below and unavailable to external processes. One ordinarily skilled in the art will see that there are other ways to make available and to maintain the integrity of the status of each of the optional components.

Figure 19:
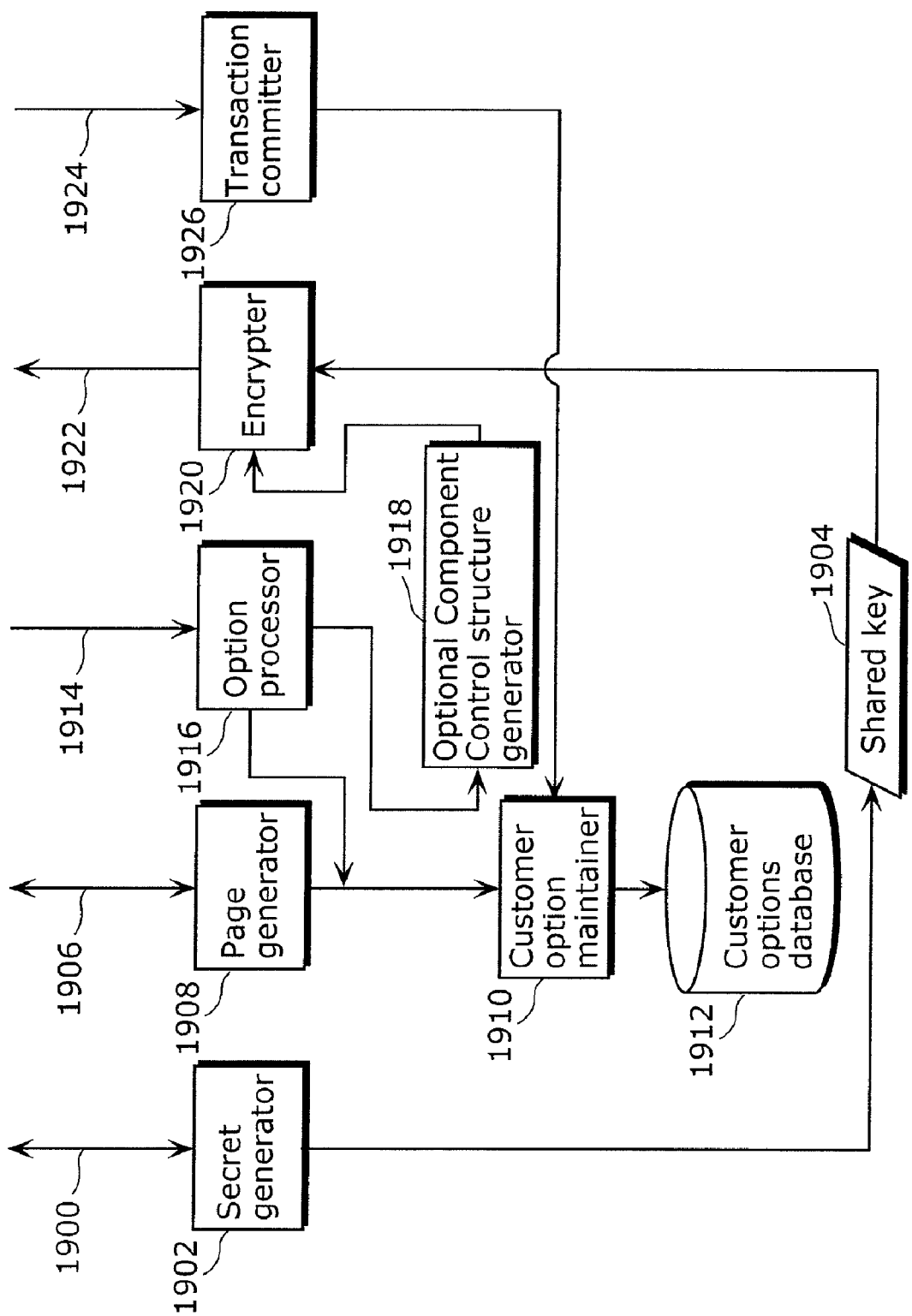
FIG. 19 illustrates a block diagram representing the key components within the server for supporting maintenance of the Optional Component Control options by a client device.

FIG. 19 illustrates another aspect of the current invention, namely the structure of the Server (224) that allows device users to maintain the optional components are enabled or disabled on their device. The key functional elements and data items are as follows. The five blocks Secret generator (1902), Page generator (1908), Option processor (1916), Encrypter (1920) and Transaction committer (1926) are the interface points to external devices, with communication flowing from left to right. First, Secret generator (1902) establishes a Shared key (1904) using a two-way communication protocol (1900) such as Diffe-Hellman. Next, the mobile device requests (1906) a contract maintenance web page, so the Page generator (1908) creates one, requesting the current optional component states from the Customer option maintainer (1910), which queries the Customer options database (1912) to find out the current state. After the device user finishes interacting with the generated web page, a completion message is sent (1914) to the server and the Option processor (1916) notifies the Customer option maintainer (1910) of the new options, starting a transaction within the Customer options database (1912). The options are passed to the Optional Component Control structure generator (1918), which formats the options into an Optional Component Update structure (1800). The Encrypter (1920) encrypts this structure with the Shared key (1904), and returns the structure (1922) to the mobile device (110). Finally, after the device finishes updating all the internal structures, a completion message (1924) is received by the Transaction committer (1926), which notifies the Customer option maintainer (1910) that the outstanding transaction within the Customer options database (1912) should be committed.

Figure 6:
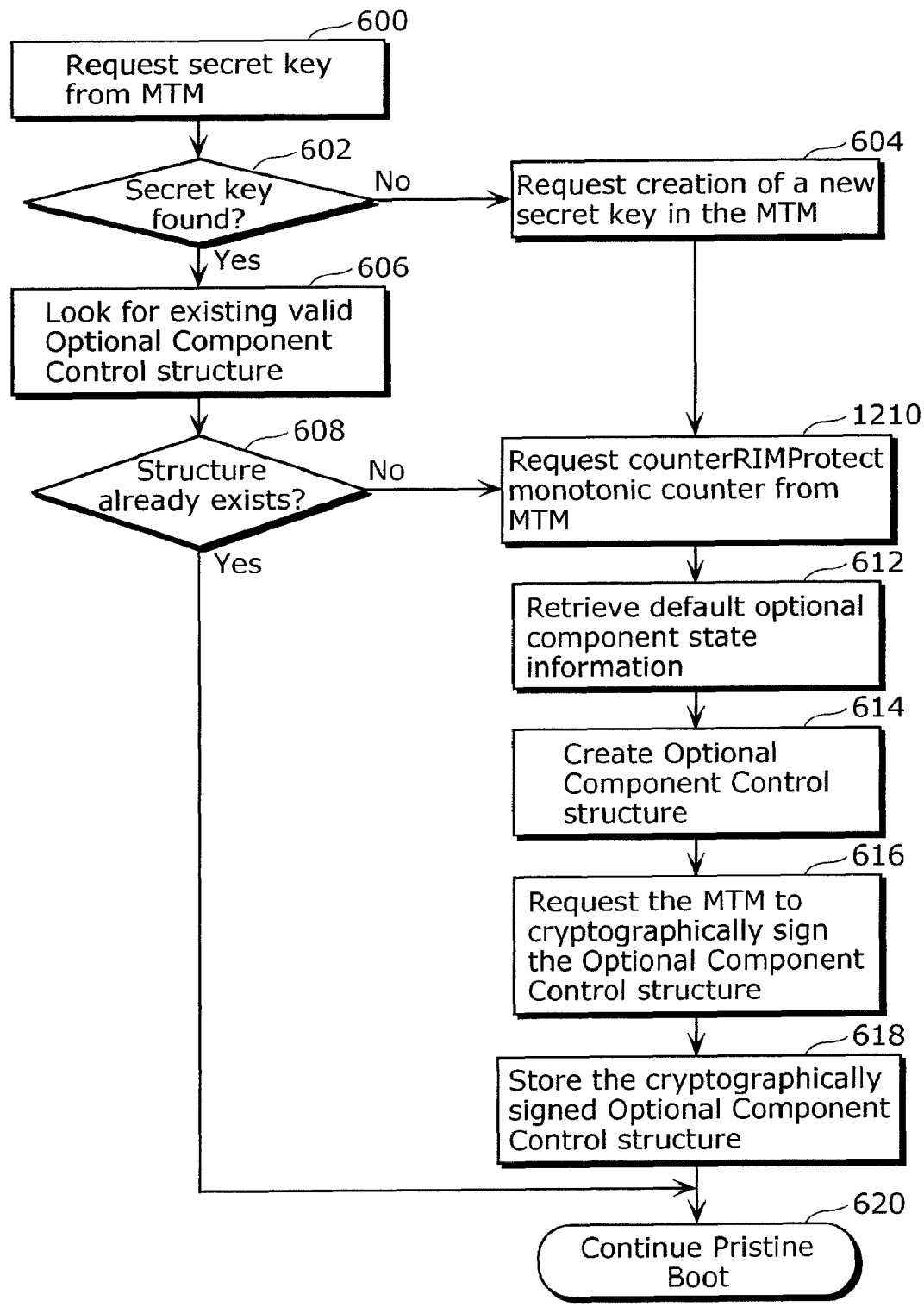
FIG. 6 illustrates a flow chart for the process of initialising the Optional Component Control structure according to the present invention.

FIG. 6 illustrates the initial creation of the Optional Component Control structure according to the present invention. The process illustrated will occur on the very first boot of the device, once the MTM has initially started up, as detailed in the TCG Mobile Trusted Module Specification for Pristine Boot. As also detailed within that document, Pristine Boot can occur at other times in the mobile device's lifecycle, so FIG. 6 also illustrates the recreation of the structure as required. First, after the Pristine Boot sequence has performed sufficient initialisation to build and initialise the MTM and the roots of trust, the secret key for signing the Optional Component Control structure is requested from the MTM (600). In the preferred embodiment, the secret key indicates the private key of an RSA key pair. The success or failure of this request is checked (602), and if the MTM failed to find the requested key, a secret key gets created within the MTM (604). This key must be created with the usage type TPM_KEY_SIGNING as defined within the TPM Main Specification Part 2, and in a preferred embodiment the key algorithm is TPM_ALG_RSA of length 1024 bits, and usable with the TPM_SS_RSASSAPKCSA1v15_SHA1 signature scheme. If the secret key is found in step (602), however, there is no need to create it, so instead there is a check to see if there is an existing and validly signed Optional Component Control structure (606). If there is one (608), there is no need to recreate it, as recreation of the structure may overwrite changed options, for instance, and the Pristine Boot procedure continues with other processing as specified within the TCG Mobile Reference Architecture (620). If there is no Optional Component Control structure (208), then the monotonic counter managed by the MTM for protecting RIM Certificates is requested (1210), as is default state information for the optional components (612). A new Optional Component Control structure (208) is created (614), and the monotonic counter is inserted into the RIMProtectValue field (502), and the optional components and their status into the fields (504) and (506), and the table terminator (508) and (510) are also created. Next, this new structure is passed to the MTM with a request to cryptographically sign it with the key created or retrieved earlier (616). This signature process results in the Cryptographic signature (512) being created. This tamper-evident Optional Component Control structure (208) may now be stored as desired (618). The creation process for the Optional Component Control structure (208) is now complete, so the Pristine Boot procedure continues with other processing as specified within the TCG Mobile Reference Architecture (620).

Figure 7:
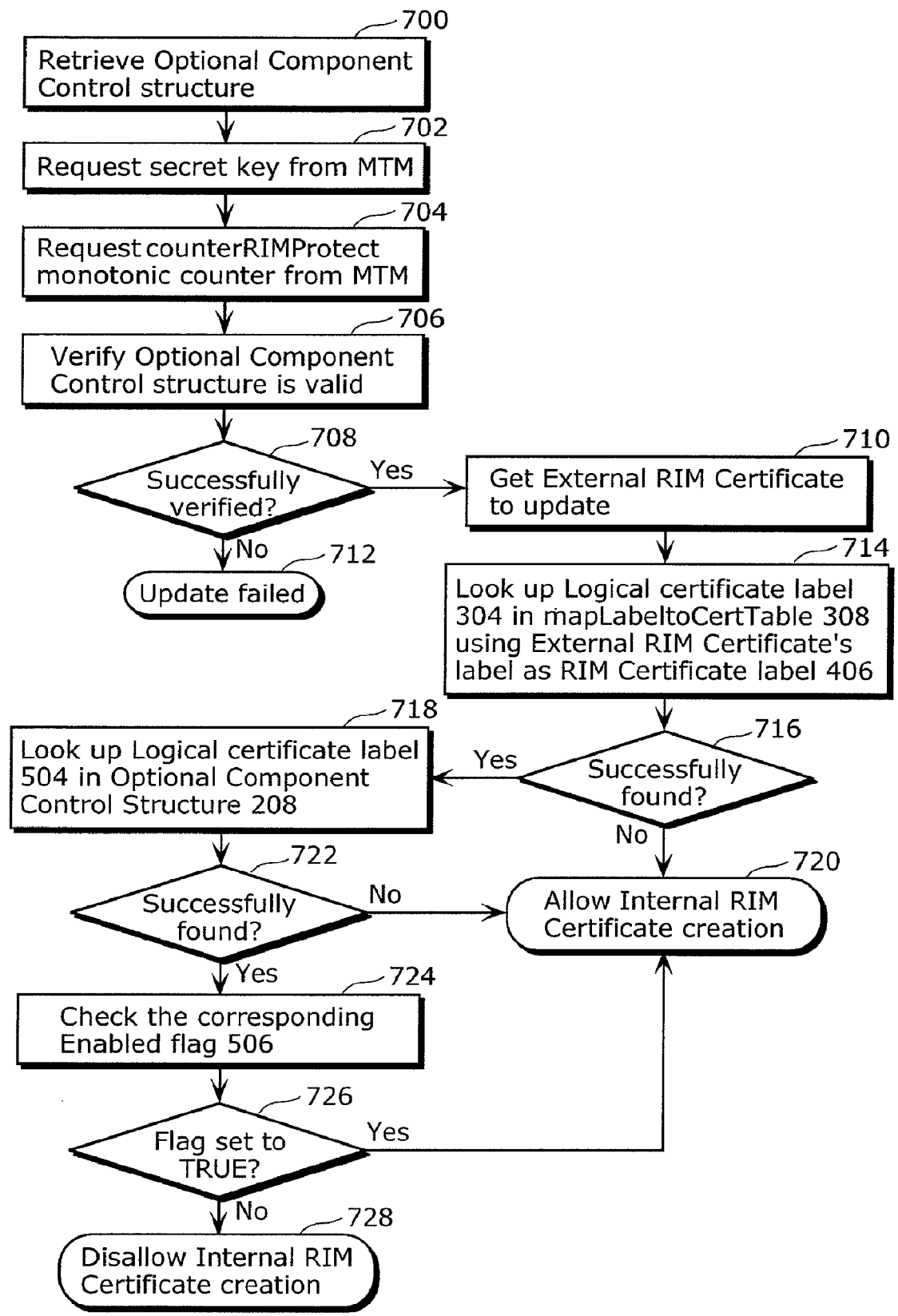
FIG. 7 illustrates a flow chart for the process of updating external RIM Certificates using the Optional Component Control structure according to the present invention.

FIG. 7 illustrates the additional processing needed for the task of RIM Updates as described in section 6.3.4.2 of the TCG Mobile Reference Architecture version 1.0 revision 1 according to the present invention. The specification describes how the RIM_Auth is verified, the external RIM_Cert has its CounterBootstrap checked, then the internal RIM Certificate is created and software installed. The process illustrated in FIG. 7 is performed after the CounterBootstrap checking to determine whether or not the internal RIM Certificate should be created and the software installed. First, the Optional Component Control structure is retrieved from the MTM (700). Next, in order to be able to verify the data is still valid and untampered, the public part of the secret key used to create the Cryptographic signature (512) in step (702) and the current counterRIMProtect monotonic counter are retrieved from the MTM (102) in step (704). The signature is verified (706) to ensure the data has not been tampered with and the current counterRIMProtect monotonic counter is compared with the RIMProtectValue (502) stored in the structure. If the stored value is greater than or equal to the current monotonic counter value, then the Optional Component Control structure is current, indicating that there has been no reflash or rollback attacks on the structure. If the results of the two checks show that either the signature is incorrect or that the current monotonic counter is greater than the RIMProtectValue 502 within the structure (708), then this RIM Update process will fail and no changes will be made to the installed programs or RIM Certificates (712). However, if the checks indicate the Optional Component Control structure is valid, then the current external RIM Certificate to update is retrieved (710). The certificate label from the external RIM Certificate is used to look up the fourth column, labelled RIM Certificate label (406) in step (714) within the mapLabelto-CertTable (308), and by checking the first column of the matching row, the corresponding Logical certificate label (400) for this label is discovered (716). If the label was not found within the table (716), then this RIM Certificate is not for an optional component, thus it is for a required component, so it may be installed as described in the TCG Mobile Reference Architecture (720).

However, if the corresponding Logical certificate label (400) is found, then this label is used to look up the Optional Component Control structure's (208) table of Logical certificate labels (504) in step (718). If a corresponding entry is not found (722), then this RIM Certificate is not one that can be externally enabled or disabled, so it may be installed as described in the TCG Mobile Reference Architecture (720). If the entry is found, then the Enabled flag (506) is retrieved and checked (724). If it is enabled (726), then the external RIM Certificate may be installed as described in the TCG Mobile Reference Architecture (720). If it is not enabled, then the external RIM will not be installed, as the component that is controlled by this certificate should not be allowed to be activated (728).

Figure 8:
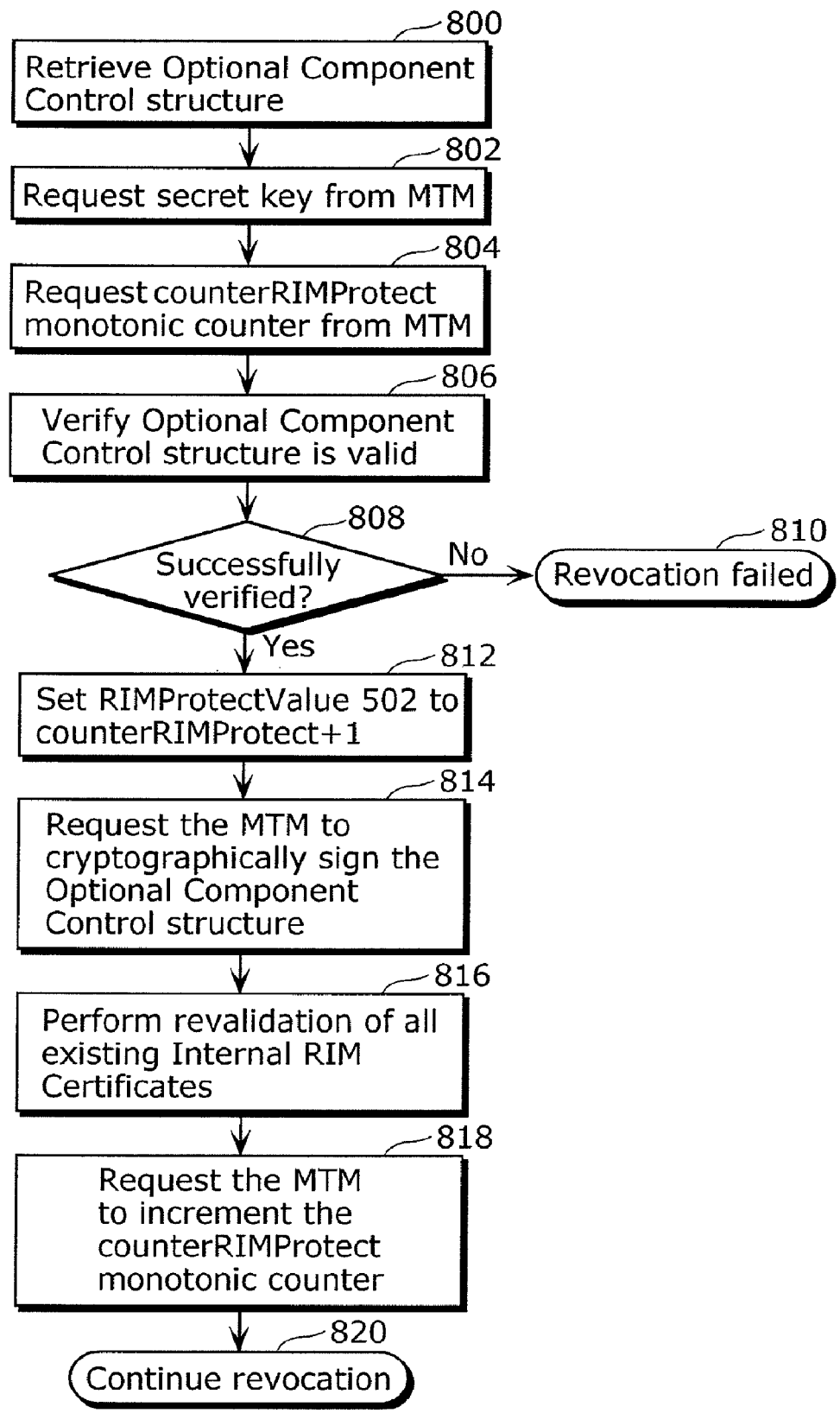
FIG. 8 illustrates a flow chart for the process of revoking internal RIM Certificates using the Optional Component Control structure according to the present invention.

FIG. 8 illustrates the additional processing needed for the task of RIM revocation as described in section 6.3.4.5 of the TCG Mobile Reference Architecture according to the present invention. The specification describes how the RIM_Auth is verified, the RIM_Cert validity list is checked for and all internal RIM_Certs that do not have a corresponding external RIM_Cert on the new validity list are deleted, all the remaining internal RIM_Certs are revalidated, and the counterRIMProtect monotonic counter updated. The process illustrated in FIG. 8 enhances the steps of revalidating all the remaining internal RIM_Certs, updating the counterRIMProtect monotonic counter. First, the Optional Component Control structure (510) is retrieved from the MTM (102) in step (800). Next, in order to be able to verify the data is still valid and untampered, the public part of the secret key used to create the Cryptographic signature (512) in step (802) and the current counterRIMProtect monotonic counter are retrieved from the MTM (804). The signature is verified to ensure the data has not been tampered with and the current counterRIMProtect monotonic counter is compared with the RIMProtectValue (502) stored in the Optional Component Control structure (510) in step (806). If the stored value is greater than or equal to the current monotonic counter value, then the Optional Component Control structure is current, indicating that there has been no reflash or rollback attacks on the structure. If the results of the two checks show that either the signature is incorrect or that the current monotonic counter is greater than the RIMProtectValue (502) within the Optional Component Control structure (510) in step (808), then the RIM revocation process fails and no changes will be made to the installed programs or RIM Certificates (810). However, if the checks indicate the Optional Component Control structure is valid, then, in step (812) the RIMProtectValue (502) within the Optional Component Control structure (510) is set to a value one greater than the current value of the counterRIMProtect monotonic counter retrieved at step (804). In step (814) a cryptographic signature is produced by the MTM according to the PKCS v1.5 algorithm signed with the secret key retrieved at step (802). Next, tasks as described in the TCG Mobile Reference Architecture specification are performed: the existing internal RIM Certificates are revalidated with an incremented RIMProtect counter value (816), then the counterRIMProtect monotonic counter is incremented to protect both the RIM Certificates and the Optional Component Control structure (208) from rollback or reflash attacks (818). Finally, the remaining revocation functions are performed as described in the TCG Mobile Reference Architecture specification (820).

Figure 9:
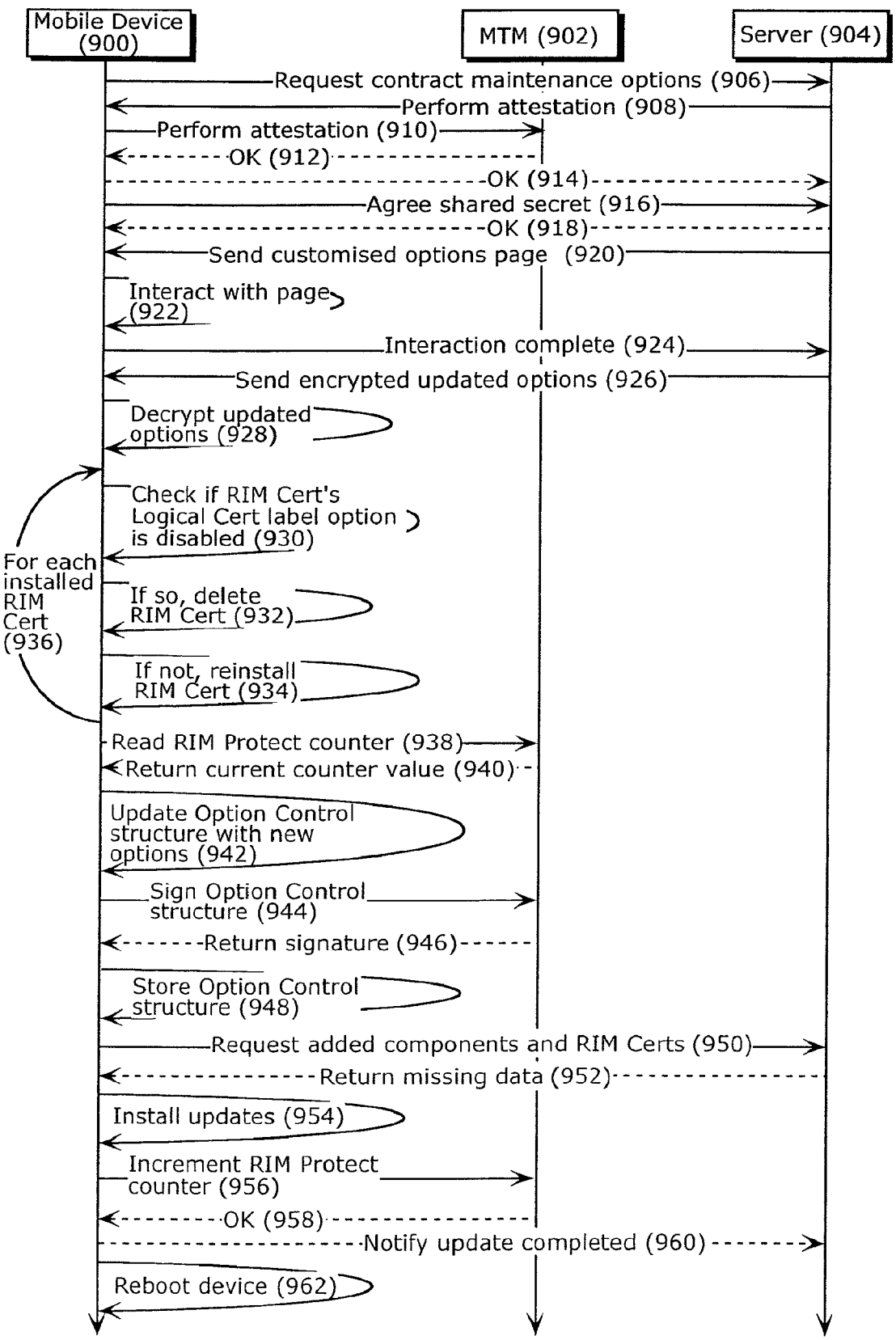
FIG. 9 illustrates a sequence diagram for the process of interacting with a server to update the Optional Component Control structure according to the present invention.
Figure 18:
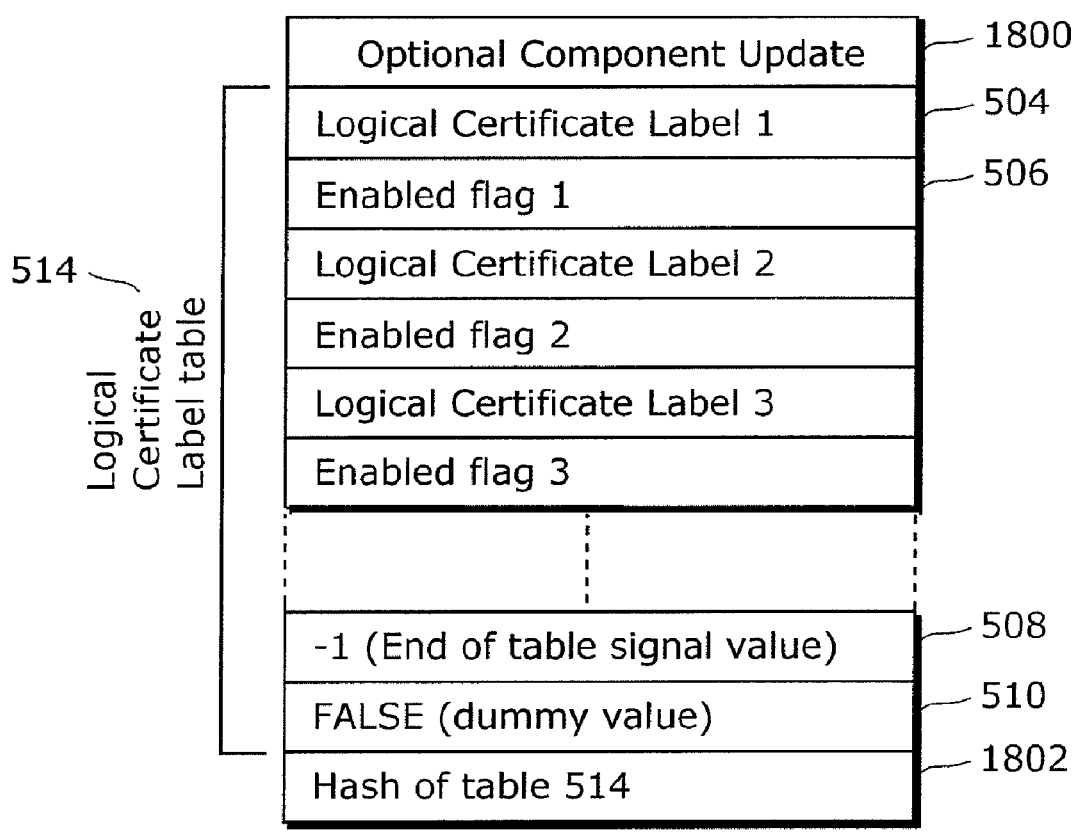
FIG. 18 illustrates an Optional Component Control Update structure that is passed from the server to the mobile device.

FIG. 9 illustrates the handling of the communication between the mobile device (900) and the server (904) that controls the activation and deactivation of the optional components. In addition, the services requested by the mobile device (900) from the Mobile Trusted Module (MTM) (902) on the device (900) are also illustrated. First, the user requests the contract maintenance options stored on the server (906). In a preferred embodiment, this is performed by establishing an SSL (Secure Socket Layer) session with the server. The server then performs attestation with the device as defined in the TCG Specification Architecture Overview to verify the identity and trust of the device (908). The device forwards the requests to the MTM (902) to enable the MTM (902) to report to the server (910). Confirmation messages are returned from the MTM 902 through the device back to the server (912, 914). After the attestation successfully completes, the client establishes a shared secret with the server using in a preferred embodiment a Diffie-Hellman key exchange (916, 918). Next, the server delivers a customized optional component page appropriate for the identified handset (920). In a preferred embodiment, this is an HTML-based page that the device user interacts with in order to select which options to add or remove from the device (922). After the desired changes are made, the device sends a message, including the new enabled or disabled states of each of the optional components, to say the interaction is complete (924). In a preferred embodiment, this is performed by a POST to an HTTPS page described within the customized options page delivered previously (920). In another preferred embodiment, the device sends a separate message for each change made by the device user. In another preferred embodiment, the device sends a separate message as soon as each change is made using an AJAX-based mechanism, and the user selects an option that sends a completion message once finished. The server updates its customer database as appropriate, then, in step (926) the server sends to the device the new set of updated components, encrypted with the key established at steps (916) and (918). These steps correspond to the items labelled (1914), (1916), (1918), (1920) and (1922) in FIG. 19. In a preferred embodiment, the data is in a similar format to the Logical Certificate Label table (514), with pairs of Logical certificate label (504) and Enabled flag (506), and terminated by the pair of values −1 (508) and FALSE (510). This is illustrated in FIG. 18, where the Option Component Update structure (1800) contains the Logical Certificate Label table (514) as described above, plus a hash of the table (1802) to ensure that the data has not been corrupted during transmission. In step (928) the device decrypts this message and verifies the hash of the table (1802), then if that is successful begins the processing of the options to ensure the enabled and disabled components are correctly configured.

The next task is for the device is to scan all the currently internal RIM Certificates and determine which of them are used by components that are disabled according to the list of optional component statuses contained within the Option Component Update structure (1800). The following describes how this task is performed. First, for each internal RIM Certificate currently on the device (936), the device determines whether or not it represents a disabled component (930). The certificate label from each internal RIM Certificate is used to look up the third column, labelled RIM Certificate label (406) within the mapLabeltoCertTable (308), and by checking the first column of the matching row, the corresponding Logical certificate label (400) for this label is discovered. The updated options decrypted at step (928) are checked to see if updated Logical certificate label (504) is present, and if so, the Enabled flag (506) is checked (930). If this is false, then this internal RIM Certificate is for an optional component that has been disabled at 922, so this certificate is deleted (932). In all other situations, the RIM Certificate is to remain, so it is reinstalled with an incremented RIM Protect counter (934). Once all the existing RIM Certificates have been checked, in step (938) the current RIM Protect counter value is requested from the MTM (902), and in step (940) this value is returned to the device from the MTM (902). In step (924) new Optional Component Control structure is created using a value one greater than the value of the RIM Protect counter retrieved at step (940), and the updated option information from step (928). A request is made to the MTM (902) to sign the data with the signing key generated according to the methods illustrated in FIG. 6 (944). The MTM (902) returns the signature (946), so the device creates the new Optional Component Control structure and stores it (948), overwriting the previous structure.

Now the device is ready to receive the external RIM Certificates and updated components, if necessary, for the optional components that have been activated. So, the device sends a request to the server for these components (950). In a preferred embodiment the device need send a simple request to initiate delivery, as the server has a record of which options were enabled after step (924) getting notification from the device. The server delivers the updated components (952). In a preferred embodiment the method of delivery and installation of the updates (954) is as described within the TCG Mobile Reference Architecture for RIM Updates. In another preferred embodiment the server delivers updated certificates and software for every component, and the processing described in FIG. 7 is used to ensure that external RIM Certificates for disabled components are not installed. In this embodiment, updated certificates for the enabled optional components is always included in the updated certificates. So, the mobile device can whichever optional component is enabled. And the server can make updated certificates without detecting which optional component is enabled in the mobile device. This can reduce cost and load on the server. In order to protect against rollback or reflash attacks, the device requests the MTM (902) to increment the RIM Protect monotonic counter (956), and the MTM (902) acknowledges the success of the operation (958). Now that all the information on the device associated with optional components has been successfully updated, namely the Optional Component Control structure (208), the appropriate Success RIM Certs (202) and Fail RIM Certs (204) and the counterRIMProtect monotonic counter, the device notifies the server that processing is complete (960). Finally, the device reboots to ensure newly-enabled components are operating and disabled components stop running (962).

Figure 10:
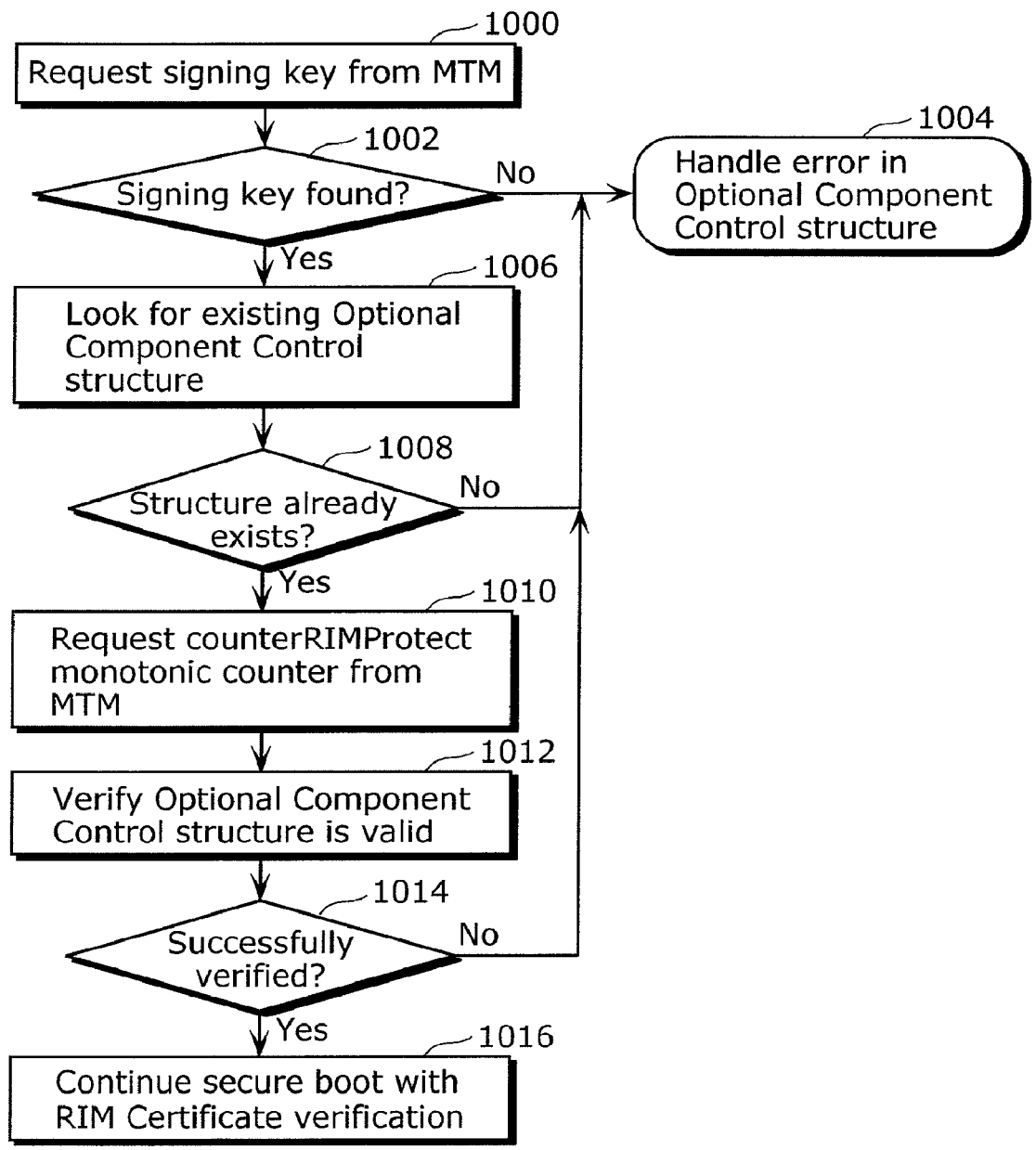
FIG. 10 illustrates a sequence diagram for enhancements to secure boot to include verification of the Optional Component Control structure according to the present invention.

FIG. 10 illustrates the secure boot process of this embodiment. This secure boot process includes operation to verify that the Optional Component Control structure (208) is valid. The processing happens after the verification of the Next Component table and the Map label to certificate table as described in the referenced patent application. First, the public part of the secret key for verifying the signature on the Optional Component Control structure (208) is retrieved (1000). If the key is not found (1002), then an error has occurred and appropriate action is taken (1004). In a preferred implementation, this will trigger recreation of a default Optional Component Control structure (208) as illustrated in FIG. 6. If the key is present, next the Optional Component Control structure (208) is requested (1006). If it does not exist (1008), then an error has occurred and appropriate action is taken (1004). Now, the counterRIMProtect monotonic counter value is retrieved (1010), and the Optional Component Control structure (208) is verified (1012). This includes both checking that the calculated signature matches the stored signature, to detect tampering, and that the stored RIMProtectValue (502) is greater than or equal to the recalled monotonic counter value. If this fails (1014), then an error has occurred and appropriate action is taken (1004). If it succeeds (1014), the Optional Component Control structure (208) is valid and the secure boot process can continue as described in the referenced patent (1016).

To illustrate how the use of a counter within the Optional Component Control structure (208) consider the case where the current counterRIMProtect monotonic counter has incremented to 4. This value of 4 will also be stored in the RIMProtectValue field (502) of the Optional Component Control structure (208) and signed with the secret key. Now, if an attacker saves the structure and disables all optional components through the processes described within FIG. 9, the counterRIMProtect monotonic counter will be incremented to 5 and a value of 5 will also be stored in the RIMProtectValue field (502) of the Optional Component Control structure (208) and signed with the secret key. However, if the user copies back the old Optional Component Control structure (208) with a RIMProtectValue (502) of 4 to try to use disabled components, then reboots the device, the checks illustrated in FIG. 10 will detect this. In step (1012) the Verification of the Optional Component Control structure (208) includes comparing the stored RIMProtectValue (502) of 4 with the counterRIMProtect value of 5, so as the stored value is lower, verification fails (1014), and an error is generated (1004). As described above, FIG. 5 to FIG. 10 illustrate a preferred embodiment where the Optional Component Control structure (208) contains a RIMProtectValue (502) and a Cryptographic signature (512). However, another preferred embodiment for maintaining the enabled or disabled status of the optional components is described below.

Figure 11:
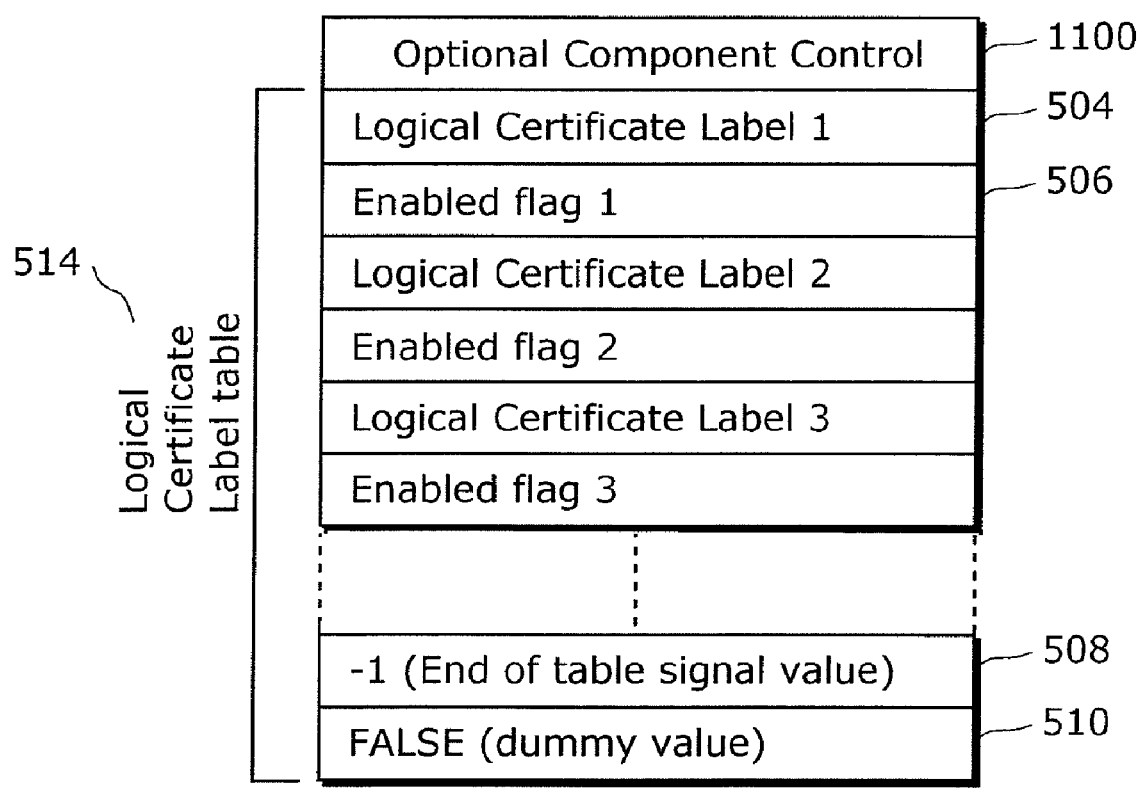
FIG. 11 illustrates an Optional Component Control structure containing a counter value, a table of certificate identifiers and their statuses, and a cryptographic signature representing the states of the optional components.

FIG. 11 illustrates a preferred embodiment of this data, such that the Optional Component Control structure (1100), is a simplified version of the previously-described Optional Component Control structure (208). As described above, there is a table with two fields in each row; first an optional trusted component Logical certificate label (504), with uses the same component identifiers as used for the Logical certificate label (400) in the mapLabeltoCertTable (308). Next, a flag (506) to indicate whether or not the optional trusted component identified by the Logical certificate label (504) is enabled, in which case the flag is set to TRUE, or disabled, in which case the flag is set to FALSE. This pair of values is repeated for each optional trusted component in the system, and the table is terminated by a Logical certificate label (508) of −1 and a flag (510) conventionally set to FALSE, for inactive. Collectively, this set of pairs of values is known as the Logical certificate label table (514).

Figure 12:
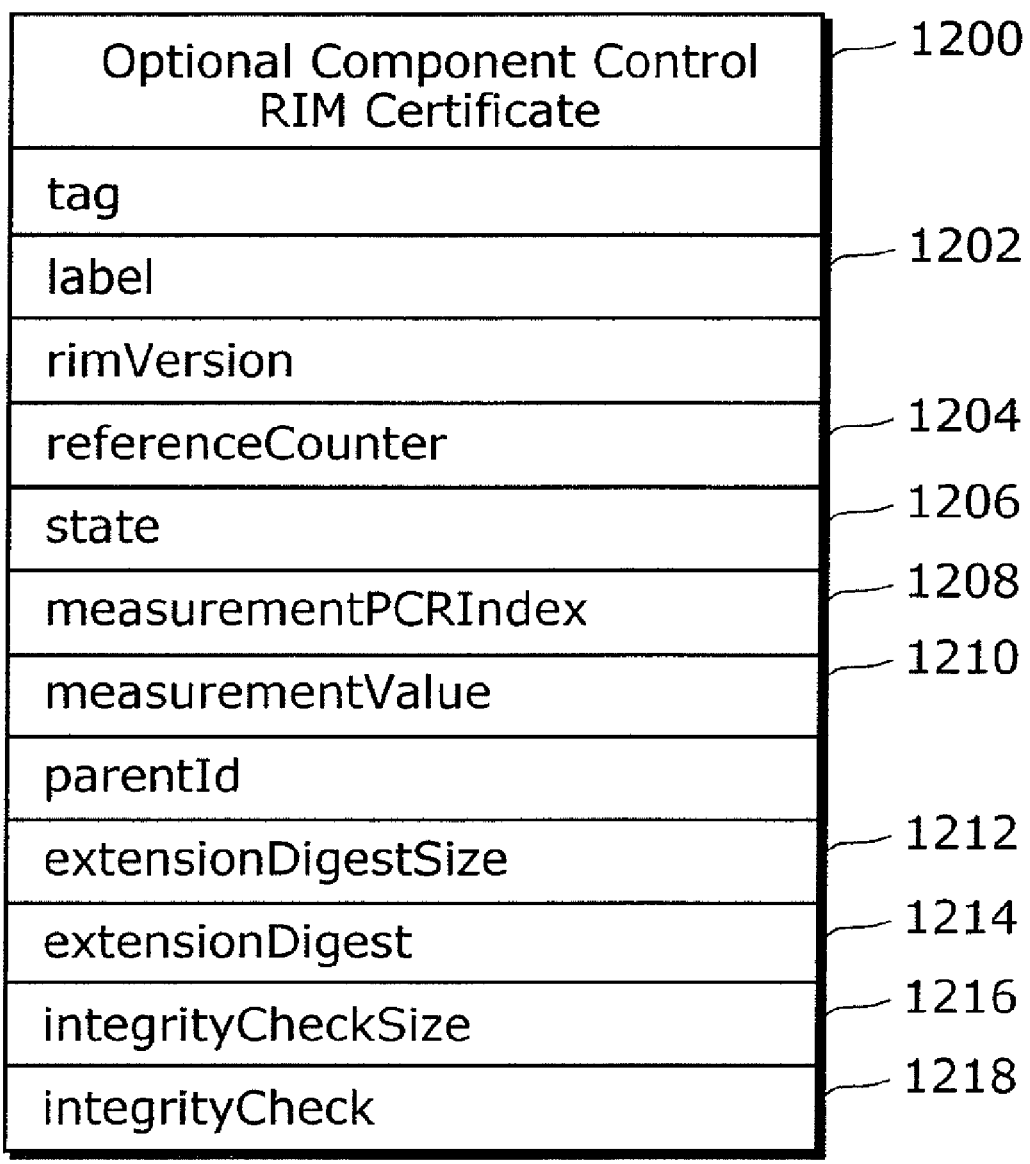
FIG. 12 illustrates an Optional Component Control structure RIM Certificate.

FIG. 12 illustrates a preferred embodiment of an Optional Component Control RIM Certificate that is used to maintain the integrity of the Optional Component Control structure (1100). This RIM Certificate is created within the device, so it is always an internal RIM Certificate, as defined by the TCG Mobile Trusted Module Specification. Within a single device, there is only one such certificate, so the label (1202) is a fixed string; in a preferred embodiment it is set to "OCC_RIMC". In the previous embodiment the RIMProtectValue (502) is used to protect against rollback or reflash attacks, but here the referenceCounter (1204) is used. This field is managed by the MTM, as defined by the TCG Mobile Trusted Module Specification. As this RIM Certificate is never passed to the MTM API MTM_VerifyRIMCertAndExtend, the state (1206) is set such that TPM_PCR_SELECTION is empty, and the measurementPCRIndex (1208) is set to the value zero. The measurementValue (1210) stores a hash of the Optional Component Control structure (1100), with the preferred embodiment using the SHA-1 algorithm to generate the value. There is no need to sign this hash. The field extensionDigestSize (1212)

is set to zero and extentionDigest (1214) is not present. In another preferred embodiment, instead of storing the hash in measurementValue (1210) that field is set to zero and instead extentionDigest (1214) stores a hash of the Optional Component Control structure (1100) and the extensionDigestSize (1212) holds the size of this hash in bytes. Finally, the integrityCheckSize (1216) and the integrityCheck (1218) store integrity check information as defined by the TCG Mobile Trusted Module Specification.

Figure 13:
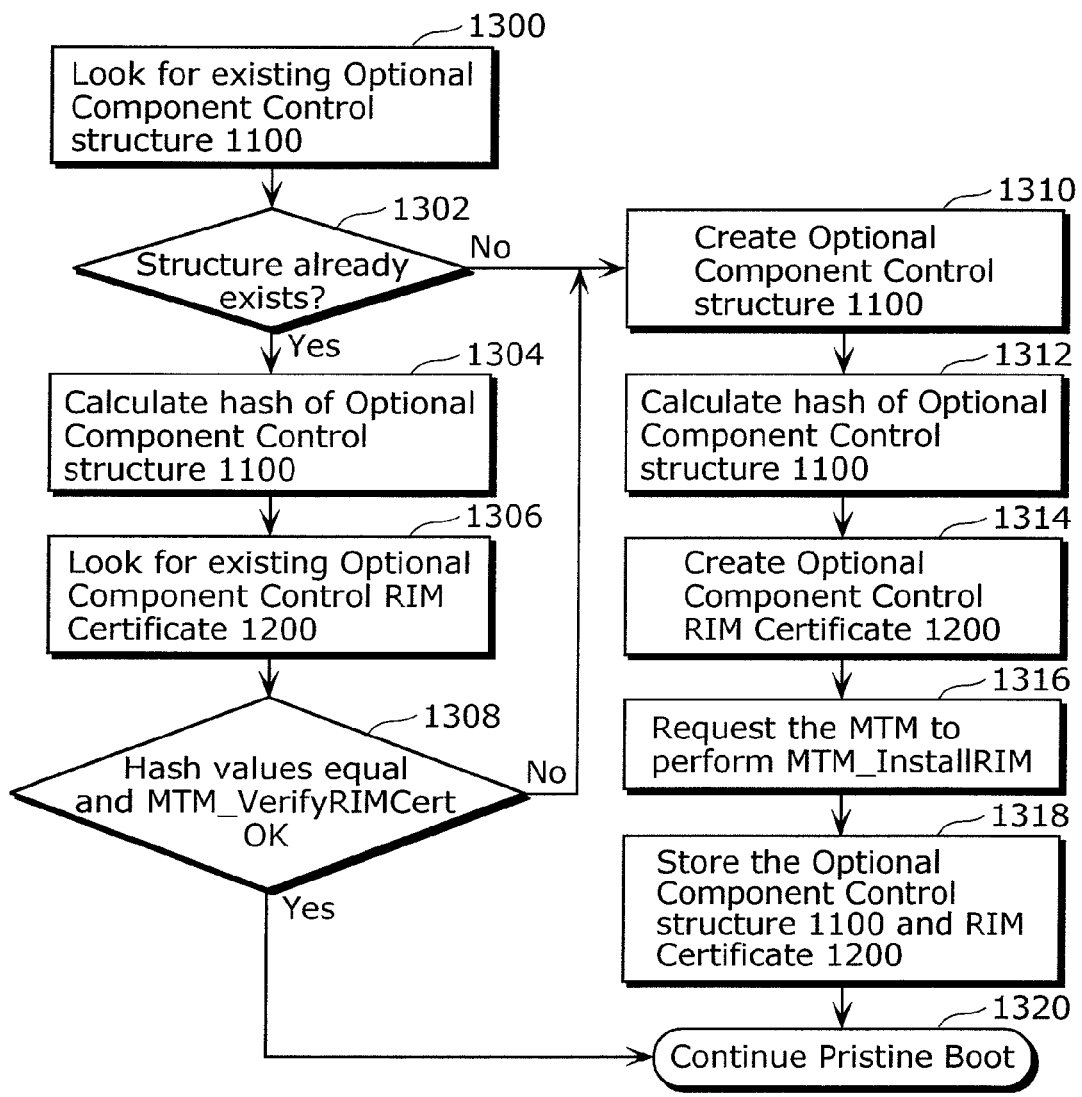
FIG. 13 illustrates a flow chart for the process of initialising the Optional Component Control structure according to the present invention.

FIG. 13 illustrates the initial creation of the Optional Component Control structure according to the present invention. The process illustrated will occur on the very first boot of the device, once the MTM 102 has initially started up, as detailed in the TCG Mobile Trusted Module Specification for Pristine Boot. As also detailed within that document, Pristine Boot can occur at other times in the mobile device's lifecycle, so FIG. 13 also illustrates the recreation of the structure as required. First, after the Pristine Boot sequence has performed sufficient initialisation to build and initialise the MTM and the roots of trust, in step (1300) there is a check to see if there is an existing Optional Component Control structure (1100). If there is one (1302), then the hash of the structure is calculated (1304) and the Optional Component Control RIM Certificate (1200) is recalled (1306). If the recall was successful and the hash value stored in measurementValue (1210) equals the hash value calculated at step (1304) and MTM_VerifyRIMCert returns TPM_SUCCESS to confirm that the structure is current and has not been tampered with (1308), the Pristine Boot procedure continues with other processing as specified within the TCG Mobile Reference Architecture (1320). If either of the checks at steps (1302) or (1308) fails, then both the Optional Component Control structure (1100) and the Optional Component Control RIM Certificate (1200) are recreated, or created for the very first time. First, a default Optional Component Control structure (1100) is created (1310), and the hash of the structure is calculated (1312). An unsigned Optional Component Control RIM Certificate (1200) is created next (1314), with the measurementValue (1210) set to the hash value calculated at step (1312). By calling the MTM API MTM_InstallRIM with this unsigned certificate, the MTM uses it as a template to create a valid internal RIM Certificate by inserting the current counterRIMProtect value into the referenceCounter (1204) field and generating the integrityCheckData (1218) using a private internal key as described in the TCG Mobile Trusted Module Specification (1316). These two new structures are stored, and (1320) the Pristine Boot procedure continues with other processing as specified within the TCG Mobile Reference Architecture (1318).

Figure 14:
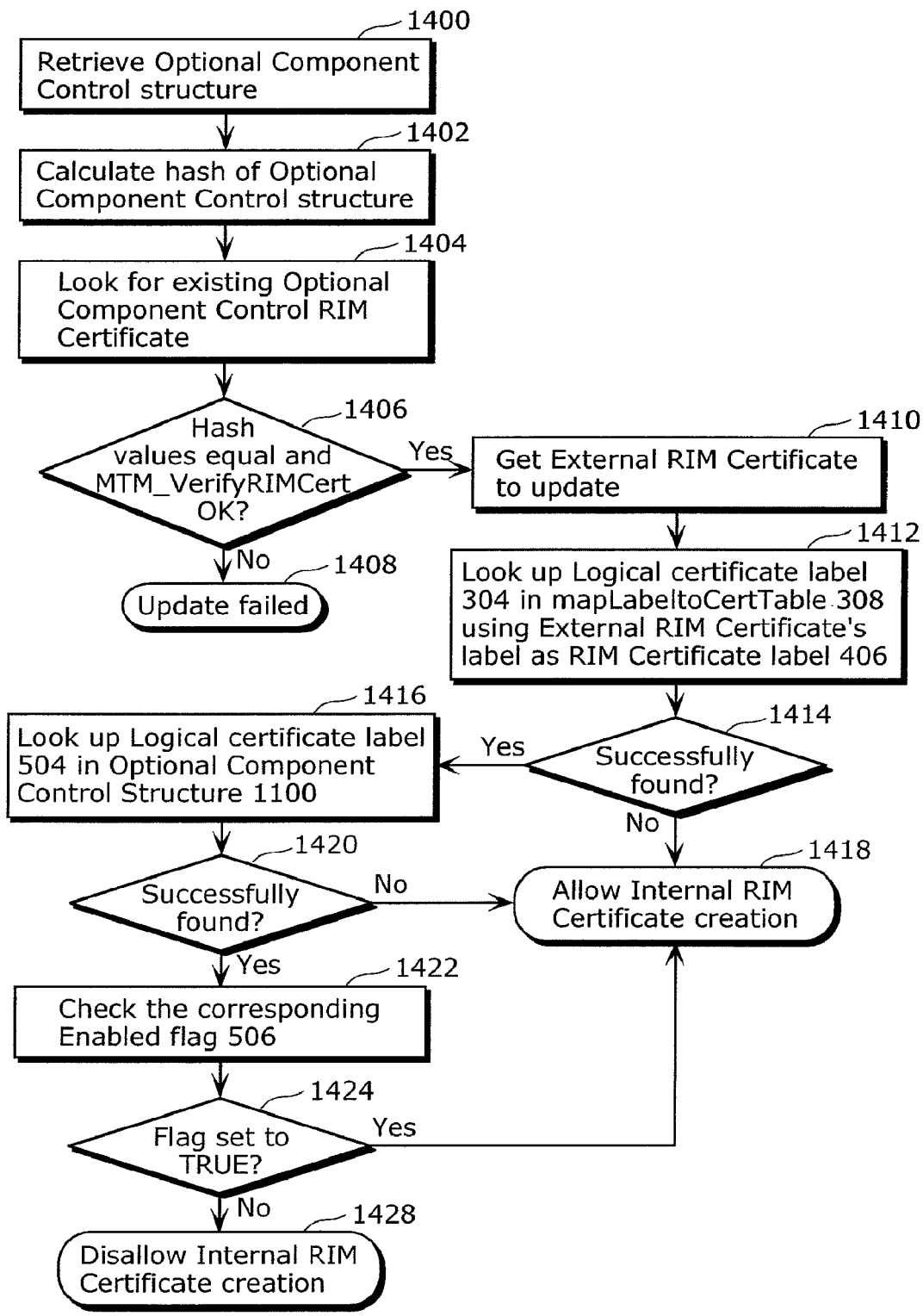
FIG. 14 illustrates a flow chart for the process of updating external RIM Certificates using the Optional Component Control structure according to the present invention.

FIG. 14 illustrates the additional processing needed for the task of RIM Updates as described in section 6.3.4.2 of the TCG Mobile Reference Architecture version 1.0 revision 1 according to the present invention. The specification describes how the RIM_Auth is verified, the external RIM_Cert has its CounterBootstrap checked, then the internal RIM Certificate is created and software installed. The process illustrated in FIG. 14 is performed after the CounterBootstrap checking to determine whether or not the internal RIM Certificate should be created and the software installed. First, the Optional Component Control structure is retrieved from the MTM (102) in step (1400). Next, the hash of the structure is calculated (1402) and the Optional Component Control RIM Certificate (1200) is recalled (1404). In step (1406), if the recall was not successful or the hash value stored in measurementValue (1210) does not equal the hash value calculated at step (1402) or MTM_VerifyRIMCert returns a value other than TPM_SUCCESS indicating that the structure is not current or has been tampered with, then the update process fails (1408). If, however, all the tests were successful, then the current external RIM Certificate to update is retrieved (1410). The certificate label from the external RIM Certificate is used to look up the fourth column, labelled RIM Certificate label (406) within the mapLabeltoCertTable (308) in step (1412), and by checking the first column of the matching row (1414), the corresponding Logical certificate label (400) for this label is discovered. If the label was not found within the table, then this RIM Certificate is not for an optional component, thus it is for a required component, so it may be installed as described in the TCG Mobile Reference Architecture (1418).

However, if the corresponding Logical certificate label (400) is found, then this label is used to look up the Optional Component Control structure's (1100) table of Logical certificate labels (504) in step (1416). If a corresponding entry is not found (1420), then this RIM Certificate is not one that can be externally enabled or disabled, so it may be installed as described in the TCG Mobile Reference Architecture (1418). If the entry is found, then the Enabled flag (506) is retrieved and checked (1422). If it is enabled (1424), then the external RIM Certificate may be installed as described in the TCG Mobile Reference Architecture (1418). If it is not enabled (1424), then the external RIM will not be installed, as the component that is controlled by this certificate should not be allowed to be activated (1426).

Figure 15:
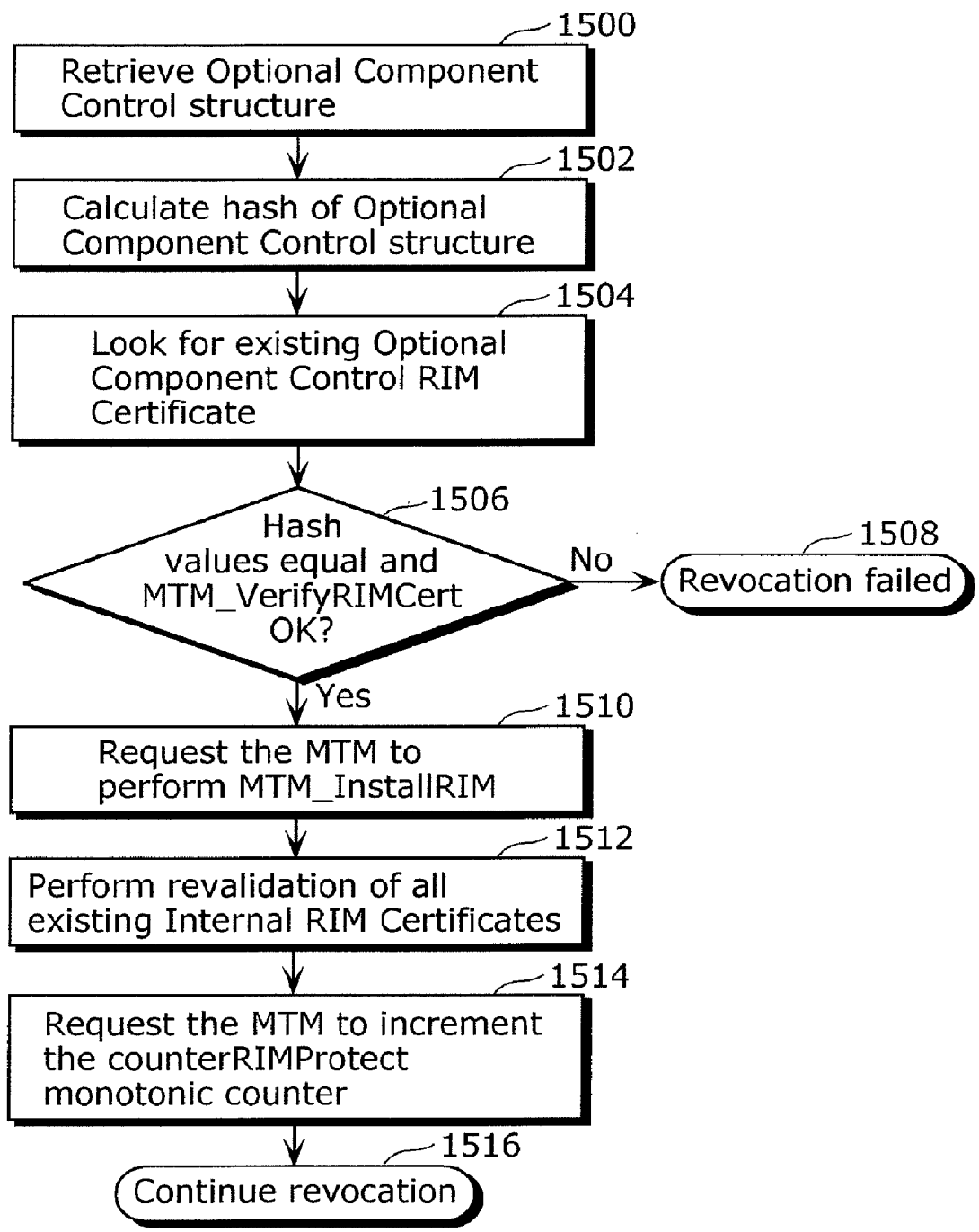
FIG. 15 illustrates a flow chart for the process of revoking internal RIM Certificates using the Optional Component Control structure according to the present invention.

FIG. 15 illustrates the additional processing needed for the task of RIM revocation as described in section 6.3.4.5 of the TCG Mobile Reference Architecture according to the present invention. The specification describes how the RIM_Auth is verified, the RIM_Cert validity list is checked for and all internal RIM_Certs that do not have a corresponding external RIM_Cert on the new validity list are deleted, all the remaining internal RIM_Certs are revalidated, and the counterRIMProtect monotonic counter updated. The process illustrated in FIG. 15 enhances the steps of revalidating all the remaining internal RIM_Certs, updating the counterRIMProtect monotonic counter. First, the Optional Component Control structure is retrieved from the MTM (1500). Next, the hash of the structure is calculated (1502) and the Optional Component Control RIM Certificate (1200) is recalled (1504). If the recall was not successful or the hash value stored in measurementValue (1210) does not equal the hash value calculated at step (1502) or MTM_VerifyRIMCert returns a value other than TPM_SUCCESS indicating that the structure is not current or has been tampered with (1506), then the RIM revocation process fails and no changes will be made to the installed programs or RIM Certificates (1508).

If the checks indicate the Optional Component Control structure (1100) is valid, then in step (1510) by calling the MTM API MTM_InstallRIM with the existing certificate retrieved in step (1504), the MTM uses it as a template to create a new internal RIM Certificate with an incremented counterRIMProtect value inserted into the referenceCounter (1204) field and then generates the integrityCheckData (1218) using a private internal key as described in the TCG Mobile Trusted Module Specification.

Next, tasks as described in the TCG Mobile Reference Architecture specification are performed: the existing internal RIM Certificates are revalidated with an incremented RIMProtect counter value (1512), then the counterRIMProtect monotonic counter is incremented to protect both the trusted component RIM Certificates and the Optional Component Control RIM Certificate (1200) from rollback or reflash attacks (1514). Finally, the remaining revocation functions are performed as described in the TCG Mobile Reference Architecture specification (1516).

Figure 16:
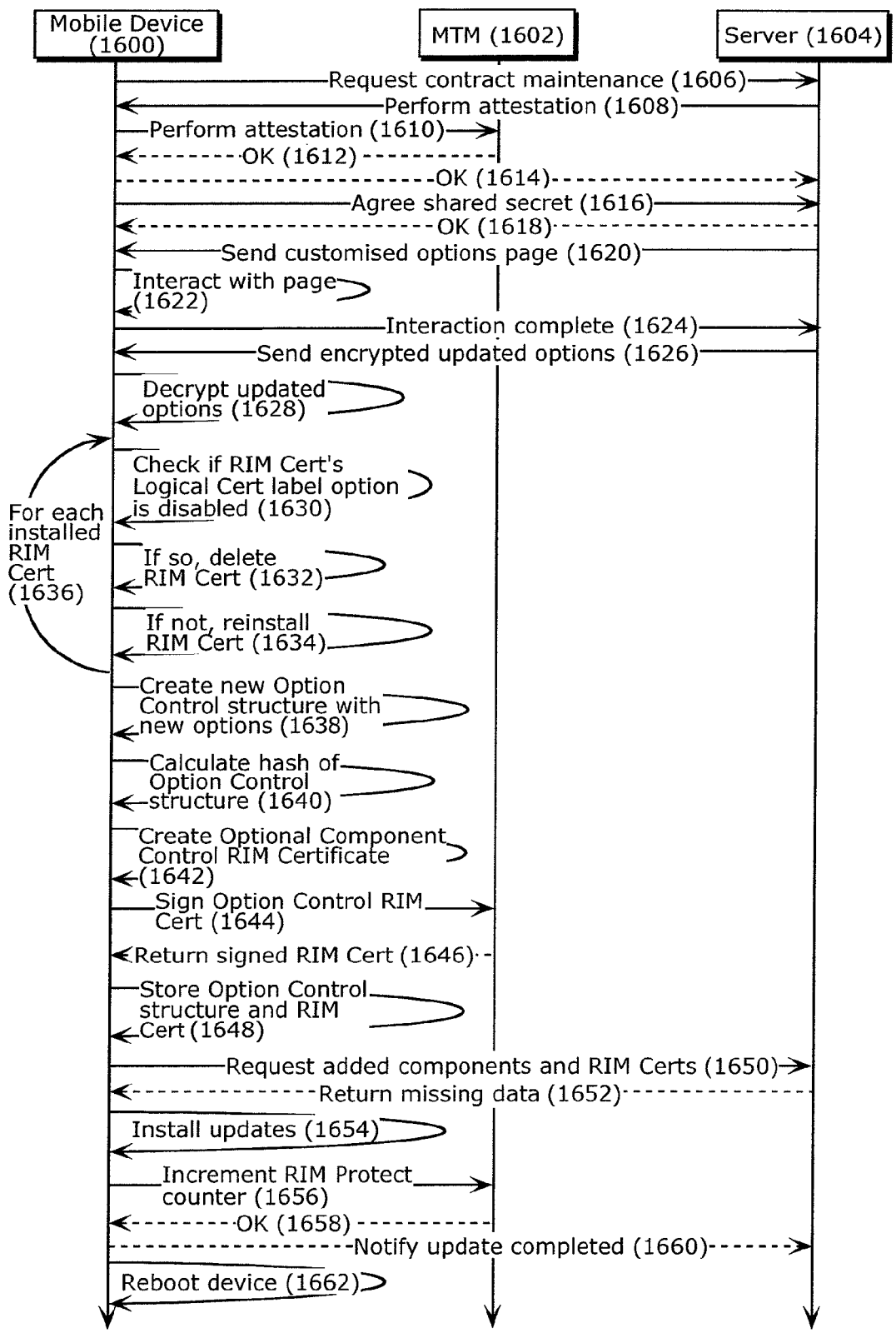
FIG. 16 illustrates a sequence diagram for the process of interacting with a server to update the Optional Component Control structure according to the present invention.

FIG. 16 illustrates the handling of the communication between the mobile device (1600) and the server (1604) that controls the activation and deactivation of the optional components. In addition, the services requested by the mobile device (1600) from the Mobile Trusted Module (MTM) (1602) on the device (1600) are also illustrated. The first part of the communication sequence numbered from step (1606) to (1636) is identical to the steps (906) to (936) illustrated in FIG. 9, so refer to that section for a description of the steps.

First, the user requests the contract maintenance options stored on the server (1606). In a preferred embodiment, this is performed by establishing an SSL (Secure Socket Layer) session with the server. The server then performs attestation with the device as defined in the TCG Specification Architecture Overview to verify the identity and trust of the device (1608). The device forwards the requests to the MTM 1602 to enable the MTM (1602) to report to the server (1610). Confirmation messages are returned from the MTM (1602) through the device back to the server (1612, 1614). After the attestation successfully completes, the client establishes a shared secret with the server using in a preferred embodiment a Diffie-Hellman key exchange (1616, 1618). Next, the server delivers a customized optional component page appropriate for the identified handset (1620). In a preferred embodiment, this is an HTML-based page that the device user interacts with in order to select which options to add or remove from the device (1622). After the desired changes are made, the device sends a message, including the new enabled or disabled states of each of the optional components, to say the interaction is complete (1624). In a preferred embodiment, this is performed by a POST to an HTTPS page described within the customized options page delivered previously (1620). In another preferred embodiment, the device sends a separate message for each change made by the device user. In another preferred embodiment, the device sends a separate message as soon as each change is made using an AJAX-based mechanism, and the user selects an option that sends a completion message once finished. The server updates its customer database as appropriate, then sends to the device the new set of updated components (1626), encrypted with the key established at steps (1616) and (1618). In a preferred embodiment, the data is of the same format as the Logical Certificate Label table (514) as illustrated in FIG. 5, with pairs of Logical certificate label (504) and Enabled flag (506), and terminated by the pair of values −1 (508) and FALSE (510). This is illustrated in FIG. 18, where the Option Component Update structure (1800) contains the Logical Certificate Label table (514) as described above, plus a hash of the table (1802) to ensure that the data has not been corrupted during transmission. The device decrypts this message and verifies the hash of the table (1802) in step (1628), then if that is successful begins the processing of the options to ensure the enabled and disabled components are correctly configured.

First, for each internal RIM Certificate currently on the device (1636), the device determines whether or not it represents a disabled component (1630). The certificate label from each internal RIM Certificate is used to look up the third column, labelled RIM Certificate label (406) within the map-LabeltoCertTable (308), and by checking the first column of the matching row, the corresponding Logical certificate label (400) for this label is discovered. The updated options decrypted at step (1628) are checked to see if updated Logical certificate label (504) is present, and if so, the Enabled flag (506) is checked. If this is false, then this internal RIM Certificate is for an optional component that has been disabled at step (1622), so this certificate is deleted (1632). In all other situations, the RIM Certificate is to remain, so it is reinstalled with an incremented RIM Protect counter (1634).

Once all the existing RIM Certificates have been checked, a new Optional Component Control structure (1100) is created (1638), and the hash of this structure is calculated (1640). Next, an unsigned Optional Component Control RIM Certificate (1200) is created next (1642), with the measurementValue (1210) set to the hash value calculated at 1640. By calling the MTM API MTM_InstallRIM with this unsigned certificate, the MTM uses it as a template to create a valid internal RIM Certificate by inserting the current counterRIMProtect value into the referenceCounter (1204) field and generating the integrityCheckData (1218) using a private internal key as described in the TCG Mobile Trusted Module Specification (1644), and the MTM returns the signed structure to the mobile device (1646). This new structure is stored (1648), and then the steps (1650) to (1662) are performed in an identical manner to the steps (950) to (962) illustrated in FIG. 9, so refer to that section for a description of the steps.

Now the device is ready to receive the external RIM Certificates and updated components, if necessary, for the optional components that have been activated. So, the device sends a request to the server for these components (1650). In a preferred embodiment the device need send a simple request to initiate delivery, as the server has a record of which options were enabled after step (1624) getting notification from the device. The server delivers the updated components (1652). In a preferred embodiment the method of delivery and installation of the updates is as described within the TCG Mobile Reference Architecture for RIM Updates (1654). In another preferred embodiment the server delivers updated certificates and software for every component, and the processing described in FIG. 14 is used to ensure that external RIM Certificates for disabled components are not installed. In this embodiment, updated certificates for the enabled optional components are always included in the updated certificates. So, the mobile device can whichever optional component is enabled. And the server can make updated certificates without detecting which optional component is enabled in the mobile device. This can reduce cost and load on the server. In order to protect against rollback or reflash attacks, the device requests the MTM (1602) to increment the RIM Protect monotonic counter (1656), and the MTM (1602) acknowledges the success of the operation (1658). Now that all the information on the device associated with optional components has been successfully updated, namely the Optional Component Control structure (208), the appropriate Success RIM Certs (202) and Fail RIM Certs (204) and the counterRIMProtect monotonic counter, the device notifies the server that processing is complete (1660). Finally, the device reboots to ensure newly-enabled components are operating and disabled components stop running (1662).

Figure 17:
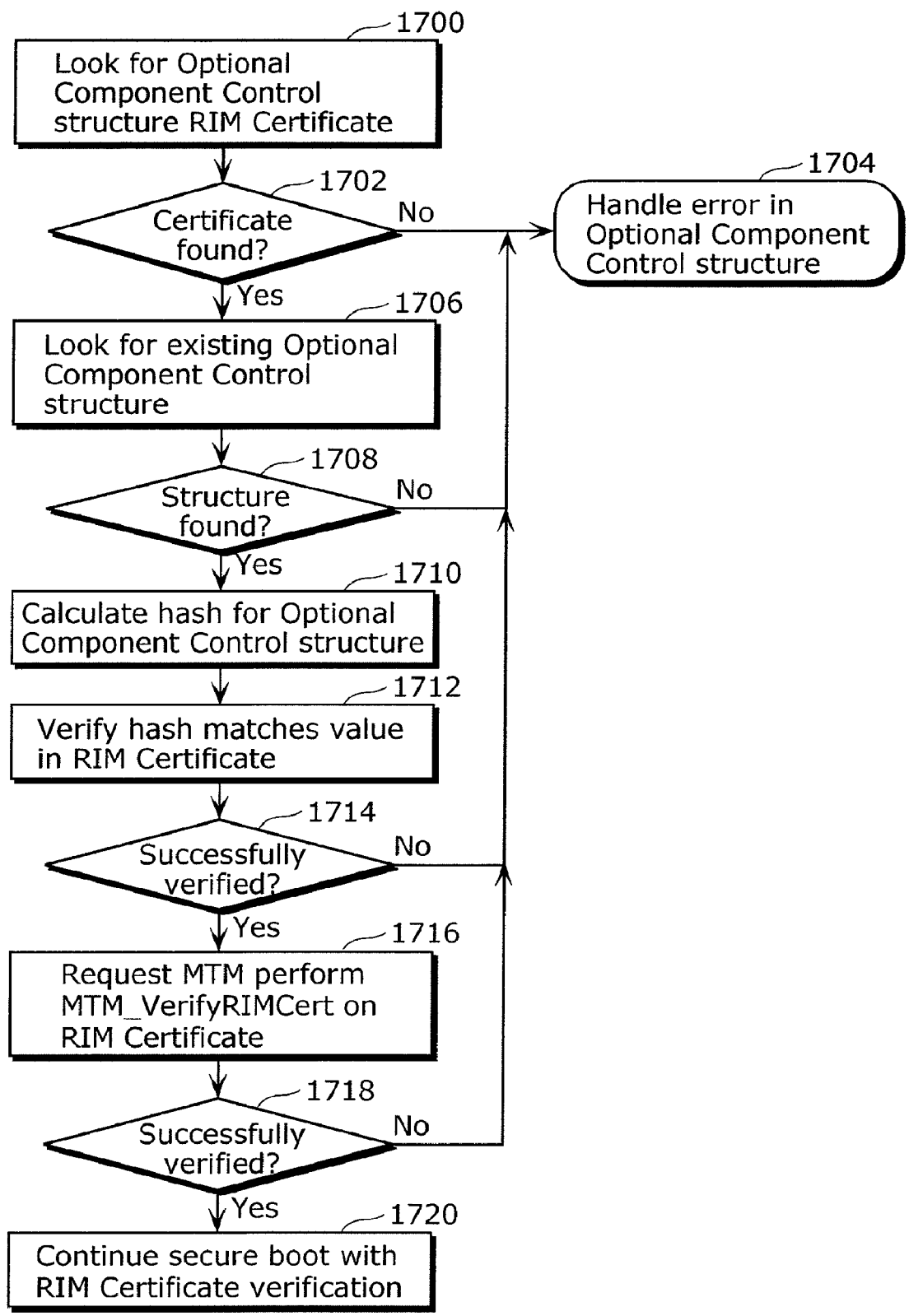
FIG. 17 illustrates a sequence diagram for enhancements to secure boot to include verification of the Optional Component Control structure according to the present invention.

FIG. 17 illustrates the secure boot process of this embodiment. This secure boot process includes operation to verify that the Optional Component Control structure (1100) is valid. The processing happens after the verification of the Next Component table and the Map label to certificate table as described in the referenced patent application. First, the Optional Component Control structure RIM Certificate (1200) is retrieved (1700). If the RIM Certificate is not found (1702), then an error has occurred and appropriate action is taken (1704). In a preferred implementation, this will trigger recreation of a default Optional Component Control structure (1100) and a matching Optional Component Control structure RIM Certificate (1200) as illustrated in FIG. 13. If the RIM Certificate is present (1706), the Optional Component Control structure (1100) is also retrieved. Again, if the structure is not found (1708), then an error has occurred and appropriate action is taken (1704). The hash value for this structure, in the preferred embodiment SHA-1 is used, is calculated (1710), and the result is compared with the hash value stored within the Optional Component Control structure RIM Certificate (1200) in the measurementValue (1210) field (1712). If the values are not equal, then an error has occurred and appropriate action is taken (1704). The final verification is performed by the MTM. The Optional Component Control structure RIM Certificate (1200) is passed as a parameter to the MTM API MTM_VerifyRIMCert, which verifies the signature on the RIM Certificate is valid and that the value stored in the referenceCounter (1204) is greater than or equal to the value of the indicated monotonic counter maintained by the MTM (1716). If the MTM returns an error to indicate that the validation has failed (1718), then an error has occurred and appropriate action is taken (1704). If it returns success, then the secure boot process can continue as described in the referenced patent (1720).

It should be noted that although the present invention is described based on aforementioned embodiment, the present invention is obviously not limited to such embodiment. The following cases are also included in the present invention.

(1) In aforementioned embodiment, the verification is performed by using hash values in a certificate (RIM Cert). However, another verification method which does not use hash values may be applied to present invention.

Conventional check sum or another data extracted from the component (for example, a first predetermined bits extracted from the component) may be used to perform verification. Furthermore, the certificate may be replaced to a data group which includes the integrity check values.

And, the verification method is not limited to check whether or not a value extracted from the component and an expected value are matches. For example, checking the size of the component, and if the size is larger or smaller than a predetermined amount the component may be judged to be verified. These verification methods are not so strict as comparing hash value with its expected value, however they are fast to be performed.

(2) In the embodiments shown above the server delivers updated certificates and software for every component. However, the server may exclude one or more updated certificates which are corresponding to one or more revoked certificates. By this structure, the server can update and revoke certificates by sending only one set of certificates.

Furthermore, if at least one of the certificates is not to be updated, the server may exclude the one or more updated certificates which are corresponding to one or more non-updated certificates. In this case, it is better to deliver information also showing which certificate is to be revoked, otherwise the non-updated certificates may be misunderstood to be revoked certificates in procedure of FIG. 15.

(3) Each of aforementioned apparatuses is, specifically, a computer system including a microprocessor, a ROM, a RAM, a hard disk unit, a display unit, a keyboard, a mouse, and the so on. A computer program is stored in the RAM or hard disk unit. The respective apparatuses achieve their functions through the microprocessor's operation according to the computer program. Here, the computer program is configured by combining plural instruction codes indicating instructions for the computer.

(4) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

Furthermore, each unit of the constituent elements configuring the respective apparatuses may be made as an individual chip, or as a single chip to include a part or all thereof.

Furthermore, here, System-LSI is mentioned but there are instances where, due to a difference in the degree of integration, the designations IC, LSI, super LSI, and ultra LSI are used.

Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appear thorough progress in semiconductor technology or other derived technology, that technology can naturally be used to carry out integration of the constituent elements. Biotechnology is anticipated to apply.

(5) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and the so on. The IC card or the module may also be included in the aforementioned super-multi-function LSI. The IC card or the module achieves its function through the microprocessor's operation according to the computer program. The IC card or the module may also be implemented to be tamper-resistant.

(6) The present invention, may be a computer program for realizing the previously illustrated method, using a computer, and may also be a digital signal including the computer program.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

(7) Those skilled in the art will readily appreciate that many modifications are possible in the exemplary embodiment without materially departing from the novel teachings and advantages of this invention. Accordingly, arbitrary combination of the aforementioned modifications and embodiment is included within the scope of this invention.

INDUSTRIAL APPLICABILITY

A device connectable to a server, includes: a storing unit which stores a plurality of pieces of software and a plurality of certificates that are associated with the plurality of pieces of the software and are used to verify the plurality of pieces of the software; and an executing unit which verifies the plurality of pieces of the software using the certificates, and executes the plurality of pieces of the software after the verification. With the device, advantageous effects described above can be obtained.

What is claimed is:

1. A device connectable to a server, comprising:
    a storing unit including a memory storing a plurality of pieces of software and a plurality of certificates associated with the plurality of pieces of software, each piece of software of the plurality of pieces of software being assigned to one certificate of the plurality of certificates, and each respective certificate of the plurality of certificates being used to verify the piece of software, of the plurality of pieces of software, associated therewith;
    a setting unit setting, to the device, one piece of software of the plurality of pieces of software as an enabled one piece of software of the plurality of pieces of software, the enabled one piece of software of the plurality of pieces of software being capable of being executed by the device;
    an executing unit verifying the enabled one piece of software of the plurality of pieces of software using a certificate, of the plurality of certificates, associated with the enabled one piece of software of the plurality of pieces of software, and executing the enabled one piece of software verified by the executing unit after the verification;
    a receiving unit receiving from the server, a plurality of updated certificates corresponding to predetermined certificates, of the plurality of certificates, determined to be updated by the server, the server determining the certificates, of the plurality of certificates, to be updated without detecting which certificate of the plurality of updated certificates corresponds to the enabled one piece of software of the plurality of pieces of software;
    a selecting unit selecting, from the received plurality of updated certificates, one updated certificate corresponding to the certificate associated with the enabled one piece of software of the plurality of pieces of software, and storing the selected updated certificate in the storing unit; and
    a flag storing unit storing an enabling flag identifying the enabled one piece of software of the plurality of pieces of software, when the setting unit sets, to the device, the enabled one piece of software of the plurality of pieces of software,
    wherein the selecting unit does not select, from the received plurality of updated certificates, an updated certificate corresponding to a certificate, of the plurality of certificates, associated with a disabled one piece of software of the plurality of pieces of software and does not store the updated certificate corresponding to the certificate associated with the disabled one piece of software in the storing unit,
    wherein the executing unit verifies the enabled one piece of software of the plurality of pieces of software using the one updated certificate selected by the selecting unit, and
    wherein the selecting unit selects, from the received plurality of updated certificates, one updated certificate corresponding to the certificate associated with the enabled one piece of software of the plurality of pieces of software, based on the enabling flag stored in the flag storing unit.

2. The device according to claim 1, wherein the plurality of updated certificates is transmitted, from the server, to the device and another device.

3. The device according to claim 1, wherein the plurality of updated certificates includes an updated certificate corresponding to a certificate, of the plurality of certificates, associated with another one piece of software of the plurality of pieces of software other than the enabled one piece of software of the plurality of pieces of software.

4. The device according to claim 1, further comprising an updating unit updating the certificate associated with the enabled one piece of software of the plurality of pieces of software, based on the one updated certificate selected by the selecting unit,
    wherein the executing unit verifies the enabled one piece of software of the plurality of pieces of software using the certificate updated by the updating unit.

5. The device according to claim 4, wherein the updating unit deletes an unselected updated certificate from the received plurality of updated certificates, without updating a certificate, of the plurality of certificates, corresponding to the unselected updated certificate.

6. The device according to claim 4, further comprising: a device key storing unit storing a device key that is a unique key of the device,
    wherein the updating unit updates the certificate associated with the enabled one piece of software of the plurality of pieces of software, by converting the one updated certificate using the device key, and overwrites the certificate associated with the enabled one piece of software of the plurality of pieces of software with the converted one updated certificate.

7. The device of claim 1 further comprising:
    a revocation determining unit determining one certificate, of the plurality of certificates, as revoked, when an updated certificate, of the received plurality of updated certificates, corresponding to the one certificate determined to be revoked is not included in the received plurality of updated certificates; and
    a revoking unit revoking the one certificate determined to be revoked and stored in the storing unit.

8. The device of claim 1 further comprising:
    a counter which increments a counter value when the revoking unit revokes the one certificate, of the plurality of certificates, stored in the storing unit;
    a counter value setting unit setting the incremented counter value to management information including the enabling flag when the counter value is incremented; and
    a determining unit determining whether the management information is tampered with, using the counter value set in the management information.

9. The device of claim 8 further comprising:
    a calculation unit calculating a cryptographic hash value of the management information including the enabling flag and the set counter value;
    a value storing unit storing a verification value corresponding to the calculated cryptographic hash value; and
    a verifying unit verifying whether or not the management information is tampered with by comparing the stored verification value and the calculated cryptographic hash value, before the selecting unit uses the management information for selecting the one updated certificate.

10. The device of claim 7 further comprising:

a mapping data storing unit storing a mapping data showing mapping between the plurality of pieces of software and the plurality of certificates;
a calculation unit calculating a cryptographic hash value of the mapping data;
a value storing unit storing a verification value corresponding to the calculated cryptographic hash value; and
a verifying unit verifying whether or not the mapping data is tampered with by comparing the stored verification value and the calculated cryptographic hash value, before the selecting unit selects the one updated certificate,
wherein the selecting unit selects the one updated certificate based on the mapping data.

11. The device of claim 10, further comprising:
a counter which increments a counter value when the revoking unit revokes the one certificate, of the plurality of certificates, stored in the storing unit; and
a counter value assigning unit assigning the incremented counter value to the mapping data when the counter value is incremented,
wherein the calculation unit calculating the cryptographic hash value using the mapping data and the counter value assigned to the mapping data.

12. A method for a device connectable to a server, the method comprising:
storing, in a storing unit, a plurality of pieces of software and a plurality of certificates associated with the plurality of pieces of software, each piece of software of the plurality of pieces of software being assigned to one certificate of the plurality of certificates, and each respective certificate of the plurality of certificates being used to verify the piece of software, of the plurality of pieces of software, associated therewith;
setting, to the device, one piece of software of the plurality of pieces of software as an enabled one piece of software of the plurality of pieces of software, the enabled one piece of software of the plurality of pieces of software being capable of being executed by the device;
verifying the enabled one piece of software of the plurality of pieces of software using a certificate, of the plurality of certificates, associated with the enabled one piece of software of the plurality of pieces of software, and executing the enabled one piece of software verified by the verifying of the enabled one piece of software after the verification;
receiving from the server, a plurality of updated certificates corresponding to predetermined certificates, of the plurality of certificates, determined to be updated by the server, the server determining the certificates, of the plurality of certificates, to be updated without detecting which certificate of the plurality of updated certificates corresponds to the enabled one piece of software of the plurality of pieces of software;
selecting, from the received plurality of updated certificates, one updated certificate corresponding to the certificate associated with the enabled one piece of software of the plurality of pieces of software;
storing the selected updated certificate in the storing unit; and
storing, in a flag storing unit, an enabling flag identifying the enabled one piece of software of the plurality of pieces of software, when the setting sets, to the device, the enabled one piece of software of the plurality of pieces of software,
wherein the selecting does not select, from the received plurality of updated certificates, an updated certificate corresponding to a certificate, of the plurality of certificates, associated with a disabled one piece of software of the plurality of pieces of software and does not store the updated certificate corresponding to the certificate associated with the disabled one piece of software in the storing unit,
wherein the executing verifies the enabled one piece of software of the plurality of pieces of software using the one updated certificate selected by the selecting of the enabled one piece of software, and
wherein the selecting selects, from the received plurality of updated certificates, one updated certificate corresponding to the certificate associated with the enabled one piece of software of the plurality of pieces of software, based on the enabling flag stored in the flag storing unit.

13. A non-transitory computer-readable recording medium having a computer program recorded thereon, the program being for a device connectable to a server, and the computer program causing a computer to execute a method comprising:
storing, in a storing unit, a plurality of pieces of software and a plurality of certificates associated with the plurality of pieces of software, each piece of software of the plurality of pieces of software being assigned to one certificate of the plurality of certificates, and each respective certificate of the plurality of certificates being used to verify the piece of software, of the plurality of pieces of software, associated therewith;
setting, to the device, one piece of software of the plurality of pieces of software as an enabled one piece of software of the plurality of pieces of software, the enabled one piece of software of the plurality of pieces of software being capable of being executed by the device;
verifying the enabled one piece of software of the plurality of pieces of software using a certificate, of the plurality of certificates, associated with the enabled one piece of software of the plurality of pieces of software, and executing the enabled one piece of software verified by the verifying of the enabled one piece of software after the verification;
receiving from the server, a plurality of updated certificates corresponding to predetermined certificates, of the plurality of certificates, determined to be updated by the server, the server determining the certificates, of the plurality of certificates, to be updated without detecting which certificate of the plurality of updated certificates corresponds to the enabled one piece of software of the plurality of pieces of software;
selecting, from the received plurality of updated certificates, one updated certificate corresponding to the certificate associated with the enabled one piece of software of the plurality of pieces of software;
storing the selected updated certificate in the storing unit; and
storing, in a flag storing unit, an enabling flag identifying the enabled one piece of software of the plurality of pieces of software, when the setting sets, to the device, the enabled one piece of software of the plurality of pieces of software,
wherein the selecting does not select, from the received plurality of updated certificates, an updated certificate corresponding to a certificate, of the plurality of certificates, associated with a disabled one piece of software of the plurality of pieces of software and does not store the updated certificate corresponding to the certificate associated with the disabled one piece of software in the storing unit, wherein the executing verifies the enabled one piece of software of the plurality of pieces of software using the one updated certificate selected by the selecting of the enabled one piece of software, and wherein the selecting selects, from the received plurality of updated certificates, one updated certificate corresponding to the certificate associated with the enabled one piece of software of the plurality of pieces of software, based on the enabling flag stored in the flag storing unit.

14. An integrated circuit used for a device connectable to a server, the integrated circuit comprising:

a storing unit including a memory storing a plurality of pieces of software and a plurality of certificates associated with the plurality of pieces of software, each piece of software of the plurality of pieces of software being assigned to one certificate of the plurality of certificates, and each respective certificate of the plurality of certificates being used to verify the piece of software, of the plurality of pieces of software, associated therewith;

a setting unit setting, to the device, one piece of software of the plurality of pieces of software as an enabled one piece of software of the plurality of pieces of software, the enabled one piece of software of the plurality of pieces of software being capable of being executed by the device;

an executing unit verifying the enabled one piece of software of the plurality of pieces of software using a certificate, of the plurality of certificates, associated with the enabled one piece of software of the plurality of pieces of software, and executing the enabled one piece of software verified by the executing unit after the verification;

a receiving unit receiving from the server, a plurality of updated certificates corresponding to predetermined certificates, of the plurality of certificates, determined to be updated by the server, the server determining the certificates, of the plurality of certificates, to be updated without detecting which certificate of the plurality of updated certificates corresponds to the enabled one piece of software of the plurality of pieces of software;

a selecting unit selecting, from the received plurality of updated certificates, one updated certificate corresponding to the certificate associated with the enabled one piece of software of the plurality of pieces of software, and storing the selected updated certificate in the storing unit; and a flag storing unit storing an enabling flag identifying the enabled one piece of software of the plurality of pieces of software, when the setting unit sets, to the device, the enabled one piece of software of the plurality of pieces of software, wherein the selecting unit does not select, from the received plurality of updated certificates, an updated certificate corresponding to a certificate, of the plurality of certificates, associated with a disabled one piece of software of the plurality of pieces of software and does not store the updated certificate corresponding to the certificate associated with the disabled one piece of software in the storing unit, wherein the executing unit verifies the enabled one piece of software of the plurality of pieces of software using the one updated certificate selected by the selecting unit, and wherein the selecting unit selects, from the received plurality of updated certificates, one updated certificate corresponding to the certificate associated with the enabled one piece of software of the plurality of pieces of software, based on the enabling flag stored in the flag storing unit.

* * * * *